United States Patent
Daniel et al.

(10) Patent No.: US 12,326,360 B2
(45) Date of Patent: Jun. 10, 2025

(54) SENSING SYSTEM FOR THE DETECTION OF ELECTROMAGNETIC RADIATION ON AN ELECTRONIC DEVICE

(71) Applicant: ams AG, Premstaetten (AT)

(72) Inventors: Bobby Daniel, Eindhoven (NL); Jagruth Prasanna Kumar, Eindhoven (NL); André Van Der Avoird, Eindhoven (NL); Erik Jan Lous, Eindhoven (NL)

(73) Assignee: AMS AG, Premstaetten (AT)

( * ) Notice: Subject to any disclaimer, the term of this patent is extended or adjusted under 35 U.S.C. 154(b) by 0 days.

(21) Appl. No.: 17/604,415

(22) PCT Filed: Apr. 17, 2020

(86) PCT No.: PCT/EP2020/060848
§ 371 (c)(1),
(2) Date: Oct. 16, 2021

(87) PCT Pub. No.: WO2020/212566
PCT Pub. Date: Oct. 22, 2020

(65) Prior Publication Data
US 2022/0214213 A1 Jul. 7, 2022

Related U.S. Application Data

(60) Provisional application No. 62/835,174, filed on Apr. 17, 2019.

(51) Int. Cl.
*G01J 1/44* (2006.01)
*G01J 1/02* (2006.01)
(Continued)

(52) U.S. Cl.
CPC .............. *G01J 1/44* (2013.01); *G01J 1/0295* (2013.01); *G01J 1/1626* (2013.01); *G01J 1/4204* (2013.01); *G01J 2001/442* (2013.01)

(58) Field of Classification Search
CPC .......... G01J 1/44; G01J 1/0295; G01J 1/4204; G01J 2001/442; G01J 1/1626; G01N 21/01; G01N 21/6402; G01N 21/84
See application file for complete search history.

(56) References Cited

U.S. PATENT DOCUMENTS

| | | | |
|---|---|---|---|
| 4,916,307 A | 4/1990 | Nishibe et al. | |
| 2009/0179880 A1* | 7/2009 | Nakajima | G02F 1/133514 345/207 |

(Continued)

FOREIGN PATENT DOCUMENTS

| | | |
|---|---|---|
| CN | 101383736 A | 3/2009 |
| CN | 102246058 A | 11/2011 |

(Continued)

OTHER PUBLICATIONS

Applicant: Ams AG; "Sensing System for the Detection of Electromagnetic Radiation"; PCT International Application No. PCT/EP2020/060848; PCT International Filing Date: Apr. 17, 2020; PCT International Search Report and Written Opinion; Examiner: Christoph Rödig; Aug. 26, 2020; 17 pgs.

(Continued)

*Primary Examiner* — Jennifer D Bennett
(74) *Attorney, Agent, or Firm* — Tarolli, Sundheim, Covell & Tummino LLP

(57) ABSTRACT

A sensing system comprising a measurement sensor configured to detect electromagnetic radiation and a reference sensor configured to detect a source of measurement uncertainty. The sensing system further comprises a shield configured to reduce an interaction between the electromagnetic radiation and the reference sensor.

8 Claims, 8 Drawing Sheets

(51) Int. Cl.
*G01J 1/16* (2006.01)
*G01J 1/42* (2006.01)

(56) References Cited

U.S. PATENT DOCUMENTS

| | | | | |
|---|---|---|---|---|
| 2011/0266420 | A1* | 11/2011 | Eldesouki | H01L 31/107 250/214.1 |
| 2011/0248175 | A1 | 12/2011 | Frach et al. | |
| 2014/0078349 | A1* | 3/2014 | Velichko | H04N 25/60 348/241 |
| 2014/0353471 | A1 | 12/2014 | Raynor et al. | |
| 2018/0261712 | A1 | 9/2018 | Moktadir et al. | |

FOREIGN PATENT DOCUMENTS

| | | | |
|---|---|---|---|
| CN | 103034913 | A | 4/2013 |
| CN | 108738031 | A | 11/2018 |
| JP | H0491472 | A * | 3/1992 |

OTHER PUBLICATIONS

N. Kumar, K. Kennedy, K. Gildersleeve, R. Abelson, C. M. Mastrangelo & D. C. Montgomery (2006) A review of yield modelling techniques for semiconductor manufacturing, International Journal of Production Research, 44:23; Dec. 1, 2006; 19 pgs.; DOI: 10.1080/00207540600596874.

CN Office Action and Search Report for corresponding CN Application No. 202080029523.2, issued Nov. 1, 2023, 20 pgs.

German Office Action for DE application No. 11 2020 001 960.8, dated Aug. 26, 2024, 6 pages.

Chinese Office Action for CN application No. 202080029523.2, dated Sep. 18, 2024, 18 pages.

Wenqing, "Learn Cadence Allegro High speed PCB Design Together", Sep. 30, 2016, 3 pages, First Edition, Beihang University Press.

* cited by examiner

SENSING SYSTEM FOR THE DETECTION OF ELECTROMAGNETIC RADIATION ON AN ELECTRONIC DEVICE

RELATED APPLICATIONS

The present invention is a U.S. National Stage under 35 USC 371 patent application, claiming priority to Application No. PCT/EP2020/060848, filed on 14 Apr. 2020, which claims priority from U.S. Provisional Application No. 62/835,174 filed 17 Apr. 2019, the entirety of both of which are incorporated herein by reference.

TECHNICAL FIELD

The disclosure relates to a sensing system and method, particularly but not exclusively, to a sensing system comprising a measurement sensor, such as a photon counter, configured to detect electromagnetic radiation.

BACKGROUND

The present disclosure relates to sensing systems and methods for detecting electromagnetic radiation having an improved quality of measurement, e.g. an improved accuracy and/or sensitivity and/or signal-to-noise ratio, and methods of designing said sensing systems.

An example of a known sensing system 100 is illustrated in FIG. 1. The known sensing system 100 comprises a measurement sensor 102 configured to detect electromagnetic radiation and produce a measurement signal that is indicative of the electromagnetic radiation. The known sensing system 100 includes a processor 106 configured to receive the measurement signal from the measurement sensor 102 and use the measurement signal to determine a characteristic of the electromagnetic radiation, e.g. an intensity of the electromagnetic radiation. Both the measurement sensor 102 and the processor 106 are located on an integrated circuit 104. The sensing system 100 may be incorporated into an electronic device, such as a mobile phone. During the detection of electromagnetic radiation, the measurement sensor 102 may experience measurement uncertainty caused by a source of measurement noise. The known sensing system 100 is not capable of discriminating between a desired component of the measurement signal that is generated by the electromagnetic radiation and an undesired component of the measurement signal that is generated by the source of measurement noise. As such, the measurement noise negatively affects a quality of the measurement, such as an accuracy and/or sensitivity and/or signal-to-noise ratio of the known sensing system 100.

It is an aim of the present disclosure to provide sensing systems and methods that address one or more of the problems described above or at least provides a useful alternative.

SUMMARY

In general, the present disclosure proposes to at least partially account for the above problems by providing sensing systems and methods of detecting electromagnetic radiation that reduce the negative impact of at least some measurement uncertainty acting on the measurement signal. The sensing systems and methods disclosed herein advantageously improve a quality of the measurement performed by the sensing system, e.g. by improving an accuracy and/or a sensitivity and/or a signal-to-noise ratio of the sensing system.

According to one aspect of the present disclosure, there is provided a sensing system comprising a measurement sensor configured to detect electromagnetic radiation, a reference sensor configured to detect a source of measurement uncertainty, and a shield configured to reduce an interaction between the electromagnetic radiation and the reference sensor.

The inventors have taken the surprising and advantageous step of introducing a reference sensor and using a shield to prevent the reference sensor from behaving as a normal sensor would in order to detect measurement noise rather than electromagnetic radiation. The reference sensor and the shield advantageously enable an improvement of the quality of measurement performed using the sensing system. For example, measurement noise caused by dark counts during the measurement is reduced, thus increasing a signal to noise ratio of the sensing system. Using blinded reference sensors advantageously enables monitoring of, and compensation for, the source of measurement noise (e.g. dark counts). The presence of a shielded reference sensor advantageously makes the sensing system easier to use by avoiding the need for a pre-measurement to estimate measurement noise. The sensing system is more robust against effects due to changes in conditions such as temperature and voltage bias.

The measurement sensor and the reference sensor may be substantially identical.

The shield may be configured to block (e.g. reflect, redirect and/or absorb) at least some radiation that would otherwise be incident upon the reference sensor. The shield may be configured to reduce an amount of radiation originating from outside the sensing system from interacting with the reference sensor. The shield may be configured to at least partially block a line of sight between the reference sensor and an external environment of the sensing system. The shield may be sized, shaped and/or positioned to at least partially block a line of sight between the reference sensor and an external environment of the sensing system. The shield may comprise a material that is substantially opaque to (e.g. blocks about 90% or more of) radiation that is to be detected by the sensing system. The shield may be configured to prevent the reference sensor from detecting any electromagnetic radiation originating from outside the confines of the shield.

The shield may comprise a material having a dielectric constant of about 1.0 or more. The shield may comprise a material having a dielectric constant of about 4.2 or less. The shield may comprise an inorganic material such as, for example, silicon dioxide and/or polysilicon. The shield may comprise an organic material such as, for example, a polymer, e.g. polyimide. A material having a low transmissivity such as, for example, black carbon and/or black silicon may be added to the shield (e.g. an inorganic or organic material of the shield) to reduce a transmissivity of the shield. The shield may comprise a metal such as, for example, tungsten, aluminum, copper, titanium and/or cobalt. A layer of metal may be provided to adhere the shield to the integrated circuit (e.g. a back-end oxide section of the integrated circuit). A layer of metal such as copper may be used as a base for electroplating at least part of the shield. The shield may comprise a ceramic such as, for example, titanium nitride. The shield may comprise one or more layers of a bottom anti-reflective coating (BARC) material such as, for example, multiple layers of titanium and/or titanium nitride and/or multiple layers of an inorganic material. The shield may be manufactured using one or more well-known techniques such as, for example, spin coating, chemical vapor deposition, physical vapor deposition, atomic layer deposition, electroplating, etc.

The shield may comprise surfaces of components of the sensing system, such as layers of electronic components and/or a housing of the sensing system. The shield may comprise multiple surfaces. Each surface of the shield may be configured to prevent radiation from reaching a respective surface of the reference sensor. The shield may comprise a plurality of layers. The plurality of layers may comprise different materials for substantially blocking different types of radiation (e.g. for blocking different wavelengths of electromagnetic radiation). The shield and the reference sensor may have complimentary shapes. The reference sensor may be nested within the shield. The shield may substantially surround the reference sensor. The shield may comprise a roof. The roof may comprise a plurality of layers. The shield may comprise walls. The walls may comprise a plurality of layers. The walls may be located in trenches around a perimeter of the reference sensor. The trenches may be filled with a substantially opaque material to form the walls.

The measurement sensor may comprise a first photon counter. The reference sensor may comprise a second photon counter. The first photon counter may comprise a first single photon avalanche diode. The second photon counter may comprise a second single photon avalanche diode.

The source of measurement noise may comprise dark counts and/or a dark count rate and/or a median dark count rate.

The measurement sensor and the reference senor may be located on a single integrated circuit.

The shield may comprise a wall located in a trench within the integrated circuit.

The reference sensor and the measurement sensor may be configured to experience substantially the same temperature. The reference sensor may be located proximate the measurement sensor such that the temperature of the reference sensor is substantially the same as the temperature of the measurement sensor. The measurement sensor and the reference sensor may be located within 2 millimeters of each other. The measurement sensor and the reference sensor may be located within 0.5 millimeters of each other. A thermally conductive path may be provided between the measurement sensor and the reference sensor. The thermally conductive path may be configured to conduct heat between the measurement sensor and the reference sensor to reduce a temperature difference between the measurement sensor and the reference sensor. The thermally conductive path may form part of the integrated circuit.

The measurement sensor and the reference sensor ay be configured to receive substantially the same bias voltage. Both the measurement sensor and the reference sensor may be connected to a single output of an electronic circuit such that the bias voltage received by the measurement sensor is substantially the same as the bias voltage received by the reference sensor during use.

The measurement sensor may be configured to produce a measurement signal that is indicative of the radiation detected by the measurement sensor. The reference sensor may be configured to produce a reference signal that is indicative of the source of measurement uncertainty detected by the reference sensor. The sensing system may comprise a processor configured to receive the measurement signal and the reference signal and use the reference signal to improve a quality of the measurement signal. The quality of the measurement signal may comprise a signal-to-noise ratio of the measurement signal. The quality of the measurement signal may comprise an accuracy of the measurement signal. The quality of the measurement signal may comprise a resolution of the measurement signal.

The measurement sensor may be one of a plurality of measurement sensors. The plurality of measurement sensors may be substantially identical to one another.

The reference sensor may be one of a plurality of reference sensors. The plurality of reference sensors may be substantially identical to one another. The shield may be configured to reduce an interaction between the electromagnetic radiation and the plurality of reference sensors. The shield may be one of a plurality of shields. The plurality of shields may be configured to reduce an interaction between the electromagnetic radiation and the plurality of reference sensors.

The number of measurement sensors may be equal to the number of reference sensors.

The plurality of measurement sensors and the plurality of reference sensors may be arranged to form an array. The array may comprise alternating measurement sensors and reference sensors.

The plurality of measurement sensors may be arranged to form a first array. The plurality of reference sensors may be arranged to form a second array. The first array and the second array may be separate from one another. A housing of the sensing system may comprise an optical window configured to allow electromagnetic radiation to interact with the first array. A housing of the sensing system may comprise at least part of the shield. The housing of the sensing system may be configured to reduce an interaction between the electromagnetic radiation and the second array.

The number of reference sensors may be less than the number of measurement sensors.

The number of measurement sensors may be equal to the number of reference sensors multiplied by an integer.

The measurement sensors may be configured to collect data for a first amount of time per measurement. The reference sensors may be configured to collect data for a second amount of time per measurement. The second amount of time may be equal to the first amount of time multiplied by the integer. This may advantageously provide a balance between measurement period length, a size (e.g. an area) of the sensing system and an improvement of the signal to noise ratio of the sensing system contributed by the presence of the reference sensors and/or an increase in the total detection area of the measurement sensors. The first amount of time and the second amount of time may overlap. The measurement sensors and the reference sensors may be configured to collect data simultaneously. The first amount of time may encompass the second amount of time. This may advantageously reduce a difference in the measurement noise (e.g. a median dark count rate) of the first and second amounts of time thereby reducing a measurement uncertainty of the sensing system.

According to a second aspect of the present disclosure, there is provided an electronic device comprising the sensing system of any preceding aspect.

The electronic device may be a telecommunications system. For example, the sensing system may be configured to detect electromagnetic radiation emanating from an optical fiber, such as a telecommunications fiber of the telecommunications system. The sensing system may advantageously improve an accuracy and/or speed with which optical signals can be detected within the telecommunications system.

The electronic device may be a computing device such as a mobile phone or a tablet computer. From example, the sensing system may form part of an ambient light sensor of the computing device. The ambient light sensor may be configured to receive a measurement signal form the sensing system and use the measurement to adjust a characteristic of the computing device. For example, the measurement signal received from the sensing system may be used to adjust a brightness of a screen of the computing device. The sensing system may advantageously enable the ambient light sensor to detect lower levels of electromagnetic radiation and/or increase a dynamic range of the ambient light sensor. The computing device comprising the sensing system may comprise physical connection means for connecting the computing device to other devices, such as a Universal Serial Bus (USB) connector. The computing device comprising the sensing system may comprise wireless connection means such as Near-Field Communication (NFC). The computing device comprising the sensing system may comprise a power source such as a battery for powering the sensing system.

The electronic device may be a medical device such as a diagnostics device. The sensing system may form part of a disposable diagnostics device (e.g. a disposable cartridge) that itself can be attached to and communicate with a computing device. For example, the sensing system may form part of a lateral flow test device and/or a multi-fluidic device such as a micro-fluidic chip or cartridge configured to analyze biological samples such as blood, saliva, urine, etc. The sensing system may comprise a plurality of arrays of measurement sensors (e.g. single photon avalanche diodes). Each array of measurement sensors may be accompanied by a corresponding array of shielded reference sensors. The measurement sensors may be configured to detect electromagnetic radiation generated by biochemical reactions. The arrays of measurement sensors and reference sensors may form part of a multi-channel integrated circuit. The multi-channel integrated circuit may comprise, for example, one, four, eight or sixteen channels. Different arrays of measurement sensors may be configured to receive electromagnetic radiation from different fluid channels of the multi-fluidic cartridge. Each array of measurement sensors may be shielded such that each array of measurement sensors receives electromagnetic radiation from their respective fluid channel. Each array of measurement sensors may be configured to detect electromagnetic radiation that is indicative of different biochemical parameters, such as reactions involving different antibodies, antigens, enzymes, proteins, etc.

The sensing systems disclosed herein may form part of an application specific integrated circuit (ASIC). The application specific integrated circuit may be configured to perform fluorescence measurements, luminescence measurements, reflectance measurements and/or absorbance measurements by using the sensing system to detect electromagnetic radiation. The application specific integrated circuit may comprise a source of electromagnetic radiation, such as a photodiode, that is separated from the sensing system. The source of electromagnetic radiation may be configured to emit electromagnetic radiation towards a sample. The electromagnetic radiation may interact with (e.g. be at least partially absorbed and/or reflected by the sample) before being detected by the sensing system. The interaction between the sample and the electromagnetic radiation may generate fluorescence radiation and/or luminescence radiation that may be detected by the sensing system. A measurement signal generated by the sensing system may be indicative of a characteristic of the sample.

According to a third aspect of the present disclosure, there is provided a method of detecting electromagnetic radiation comprising using a measurement sensor to detect the electromagnetic radiation, using a reference sensor to detect a source of measurement uncertainty, and using a shield to reduce an interaction between the electromagnetic radiation and the reference sensor.

The method may comprising using the sensing system of any preceding aspect.

According to a fourth aspect of the invention, there is provided a method of designing a sensing system comprising a measurement sensor, the measurement sensor comprising a detection area configured to detect electromagnetic radiation. The method comprises the following steps:
(a) determining a relationship between a yield of the detection area and a total size of the measurement sensor;
(b) using the relationship to define an area optimization factor; and,
(c) using the area optimization factor to select a size of the detection area.

The relationship may comprise the number of defects per unit area of the detection area of the measurement sensor. The measurement sensor may comprise a photon counter, such as a single photon avalanche diode. The total area of the measurement sensor may include a support area of the measurement sensor and the detection area of the measurement sensor. The detection area of the measurement sensor may be configured to detect incident photons. The support area may include electronic circuit components belonging to the measurement sensor. The method advantageously provides a section of the size of the detection area size of an individual measurement sensor that balances yield-loss of the measurement sensor and total area usage of the sensing system. The method advantageously improves a balance between a signal-to-noise ratio of the sensing system and a size (e.g. an area) of the sensing system.

Step (c) may comprise selecting the size of the detection area to reduce the area optimization factor.

Step (c) may comprise increasing a total detection area of the sensing system by introducing a plurality of measurement sensors.

In the case of a photon counter, increasing the detection area of the measurement sensor advantageously improves a signal to noise ratio of the sensor. This is because the contribution of the statistical fluctuation of the component of measurement uncertainty to the noise experienced by the sensor may be determined by determining a standard deviation of a median value of the component of measurement uncertainty. The standard deviation of a variable that follows a Poisson distribution is equal to the square root of the median value of the variable. As such, increasing the detection area of the sensor by a factor of N increases the signal experienced by the sensor by a factor of N and increases the component of measurement uncertainty that follows a Poisson distribution by a factor of the square root of N. That is, by increasing the detection area of the sensor, the resulting increase to the signal experienced by the sensor during use is greater than the resulting increase to the noise experienced by the sensor during use. Step (a) may comprise using the following equation:

$$\text{Yield}(\text{Active}_{Area}) := e^{-\text{Active}_{Area} \cdot ND}$$

where $\text{Yield}(\text{Active}_{Area})$ is a yield of the detection area as a function of the size of the detection area; e is Euler's constant; $Active_{Area}$ is the size of the detection area and ND is the number of defects per unit area of the detection area.

The yield may be defined as a comparison between the amount of functioning detection area and the total detection area. For example, the yield may be the amount of functioning detection area as a percentage of the total detection area.

Step (a) may comprise using the following equation:

$$Total_{Area} = \frac{ActiveA_{Total\_Reqd}}{Active_{Area}} \cdot \left(\frac{1}{Yield}\right) \cdot (Active_{Area} + Support_{Area})$$

where $Total_{Area}$ is the total size of the plurality of measurement sensors, $ActiveA_{Total\_Reqd}$ is the total size of the detection area of the plurality of measurement sensors, Yield is the yield of the detection area of a single measurement sensor, $Active_{Area}$ is the size of the detection area of a single measurement sensor and $Support_{Area}$ is the size of the support area of a single measurement sensor.

The area optimization factor may be defined by the following equation:

$$Area\_Factor_{(Active_{Area}, Support_{Area})} = \frac{1}{Active_{Area}} \cdot \left(\frac{1}{Yield(Active_{Area})}\right) \cdot (Active_{Area} + Support_{Area})$$

where $Yield(Active_{Area})$ is a yield of the detection area as a function of the size of the detection area.

Step (c) may comprise calculating the area optimization factor for a plurality of different values of the size of the detection area. Step (c) may comprise selecting the size of the detection area that corresponds to the smallest value of the area optimization factor.

The method may comprise providing a reference sensor configured to detect a source of measurement uncertainty. The method may comprise providing a shield to reduce an interaction between the electromagnetic radiation and the reference sensor.

The measurement sensors may be configured to produce a measurement signal that is indicative of the radiation detected by the measurement sensors. The reference sensor may be configured to produce a reference signal that is indicative of the source of measurement uncertainty detected by the reference sensor. The method may further comprise providing a processor configured to receive the measurement signal and the reference signal, and use the reference signal to improve a quality of the measurement signal.

The method may comprise providing a plurality of shielded reference sensors.

The method may comprise providing an equal number of measurement sensors and reference sensors.

The method may comprise arranging the plurality of measurement sensors and the plurality of reference sensors to form an array. The array may comprise alternating measurement sensors and reference sensors.

The method may comprise providing fewer shielded reference sensors than measurement sensors.

The method may comprise providing a number of measurement sensors that is equal to the number of shielded reference sensors multiplied by an integer.

The method may comprise configuring the measurement sensors to collect data for a first amount of time per measurement and configuring the shielded reference sensors to collect data for a second amount of time per measurement, wherein the second amount of time is equal to the first amount of time multiplied by the integer.

According to a fifth aspect of the present disclosure, there is provided a sensing system designed in accordance with any preceding aspect.

DESCRIPTION

Some embodiments of the disclosure will now be described by way of example only and with reference to the accompanying drawings, in which:

FIG. 1 schematically depicts a view from above a known sensing system;

FIG. 2, comprising FIG. 2A and FIG. 2B, schematically depicts a view from above (FIG. 2A) and a cross-sectional view from the side (FIG. 2B) of a sensing system comprising a reference sensor and a shield;

Figure 5:
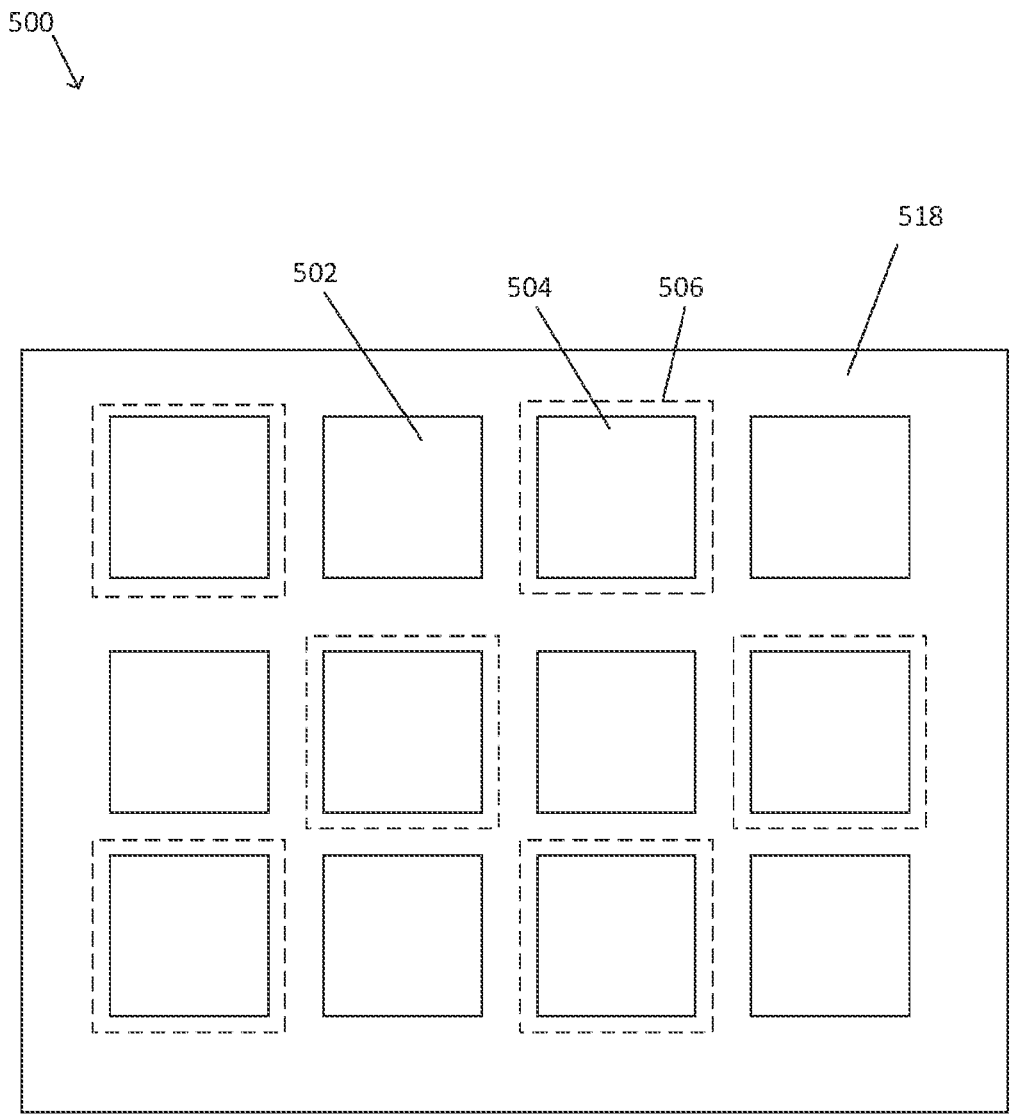
Figure 6:
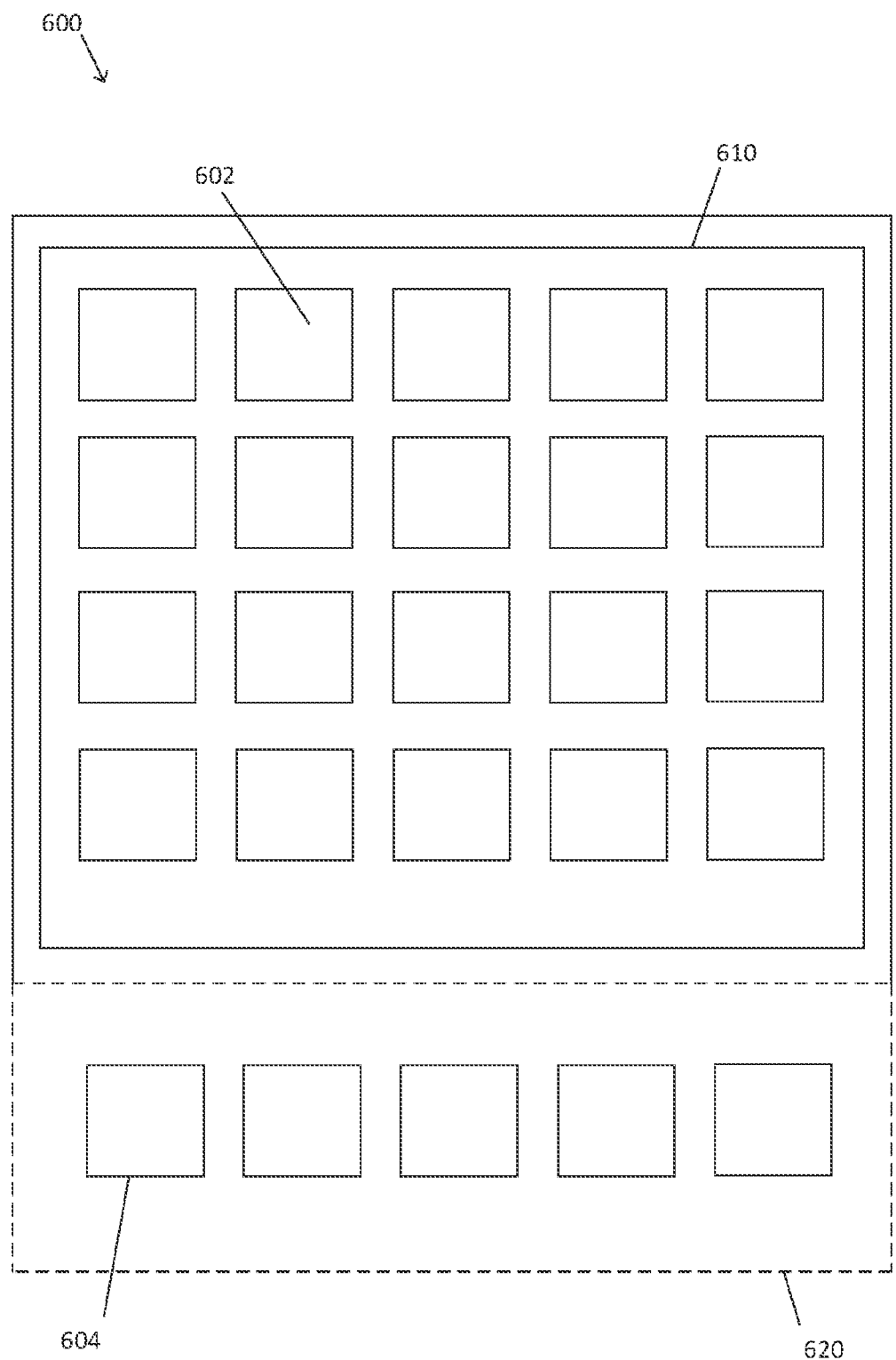
Figure 7:
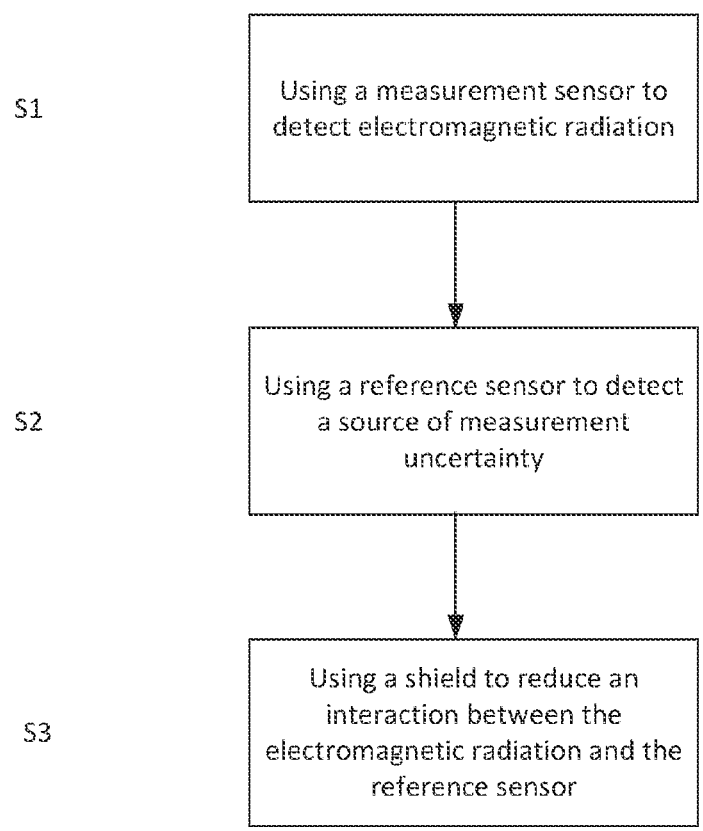
Figure 8:
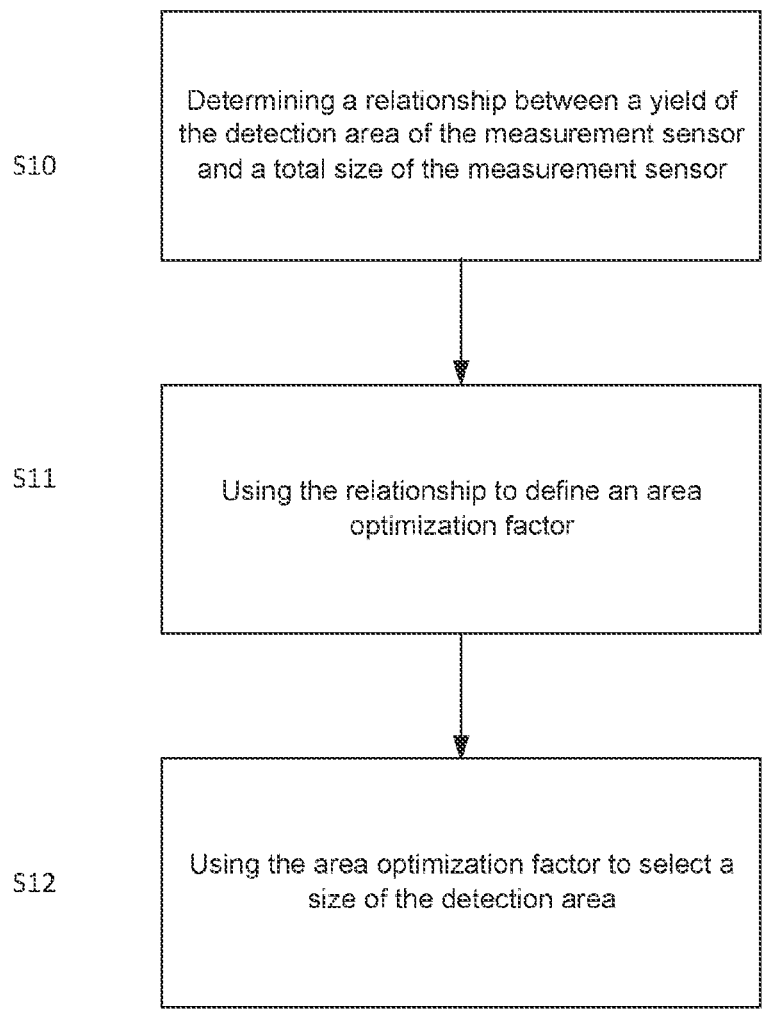

FIG. 5 schematically depicts a view from above a portion of a sensing system comprising an array of alternating measurement sensors and reference sensors;

FIG. 6 schematically depicts a view from above a portion of a sensing system comprising separate arrays of measurement sensors and reference sensors;

FIG. 7 shows a flowchart of a method of detecting electromagnetic radiation using a measurement sensor, a reference sensor and a shield; and, FIG. 8 shows a flowchart of a method of designing a sensing system comprising a measurement sensor having a detection area configured to detect electromagnetic radiation.

DETAILED DESCRIPTION

The detection of low intensities of electromagnetic radiation (e.g. the detection of individual photons or tens of photons or hundreds of photons) may be desirable in a variety of technological fields, e.g. diagnostic medical uses and/or luminescence-based sensing systems and/or fluorescence-based sensing systems. Such sensing systems may be used in a variety of settings such as point of care testing, the detection of chemicals and/or chemical reactions, electronic-nose type applications, etc. A measurement sensors such as a photon counter (e.g. a single photon avalanche diode—which may be referred to as a SPAD) may be incorporated into a sensing system to offer the ability to detect low intensity electromagnetic radiation by counting small numbers of photons.

The smallest amount of electromagnetic radiation that a measurement sensor is capable of detecting may be at least partially determined by a measurement uncertainty or noise experienced by the measurement sensor. Different types of measurement sensor may experience different sources of measurement noise. For example, a source of measurement noise experienced by a photon counter may comprise dark counts. When a photon is incident on a detection area (or active area) of the photon counter, the photon has a certain probability of interacting with a detection area of the photon counter and triggering what may be referred to as a breakdown event. The breakdown event may generate an electrical signal such as an electrical current that may be detected, e.g. by using an electronic circuit. By counting the number of breakdown events that are detected by the photon counter, a measurement of the number of photons incident on the photon counter may be determined. However, a breakdown event may be triggered not only by incident photons, but also by thermally generated electric charge carriers within the photon counter. The thermally generated breakdown events may contribute to the total number of breakdown events counted by the photon counter. The thermally generated counts may be referred to as dark counts. Dark counts may contribute to measurement noise because the photon counter cannot discriminate between counts generated by incident photons and dark counts. The measurement noise experienced by the sensing system may be at least partially determined by the uncertainty of how many dark counts contributed to the total number of counts detected by the photon counter.

The number of dark counts per second may be referred to as a dark count rate (or DCR). The dark count rate may behave in a manner that is similar to shot noise. That is, a photon counter (such as a single photon avalanche diode) operating under substantially constant conditions (such as a temperature of the photon counter and/or a voltage bias applied to the photon counter) may experience a substantially Poissonian distribution of dark count rate. As such, under substantially constant conditions, the dark count rate experienced across multiple measurement periods may fluctuate as a statistical distribution having a standard deviation that is substantially equal to a square root of a median value of the dark count rate. The inherent statistical fluctuation of dark count rate about the median value of dark count rate may be considered as a first component of measurement noise caused by dark counts.

A second component of measurement noise caused by dark counts may be a variation of the median value of dark count rate caused by changing conditions. For example, the median value of dark count rate may be sensitive to conditions such as a temperature of the photon counter and/or a voltage bias applied to the photon counter. Changes in such conditions during a measurement may result in the median value of dark count rate drifting significantly over time. The temperature dependency may be especially strong because dark count rate may be exponentially related to temperature. That is, the dark count rate may increase exponentially with increasing temperature. For example, in some cases the median value of dark count rate may change by a factor of about two for a temperature change of about four degrees Celsius. The drift in the median value of dark count rate caused by changing conditions may quickly become the dominant source of measurement noise compared to the measurement noise caused by the inherent statistical fluctuation of dark count rate.

A known method of improving a quality of a measurement performed by a photon counter involves increasing a photon detection efficiency of the photon counter. Achieving this involves fine-tuning the design of the photon counter during an expensive and time-consuming iterative process. The known method may improve the performance of the photon counter, but may also require sacrifices to be made in respect of other components and electronic circuitry belonging to the sensing system. The known method may result in a prohibitively expensive sensing system requiring a specialized process with limited manufacturing volumes and long lead times. The known method may not account for measurement noise caused by variation of the median dark count rate over time.

The smallest amount of electromagnetic radiation that can be detected reliably by a photon counter such as a single photon avalanche diode may be at least partially determined by the measurement noise caused by dark counts (i.e. the measurement uncertainty introduced by the dark counts). The present disclosure describes sensing systems and methods that reduce one or more components of the measurement noise introduced by dark counts. The present disclosure describes sensing systems and methods of detecting electromagnetic radiation having an improved quality of measurement, such as an improved measurement accuracy and/or an improved signal-to-noise ratio (which may be referred to as SNR). The present disclosure describes a method of designing sensing systems having an improved quality of measurement that are capable of reliably detecting smaller amounts of electromagnetic radiation compared to known sensing systems.

Figure 1:
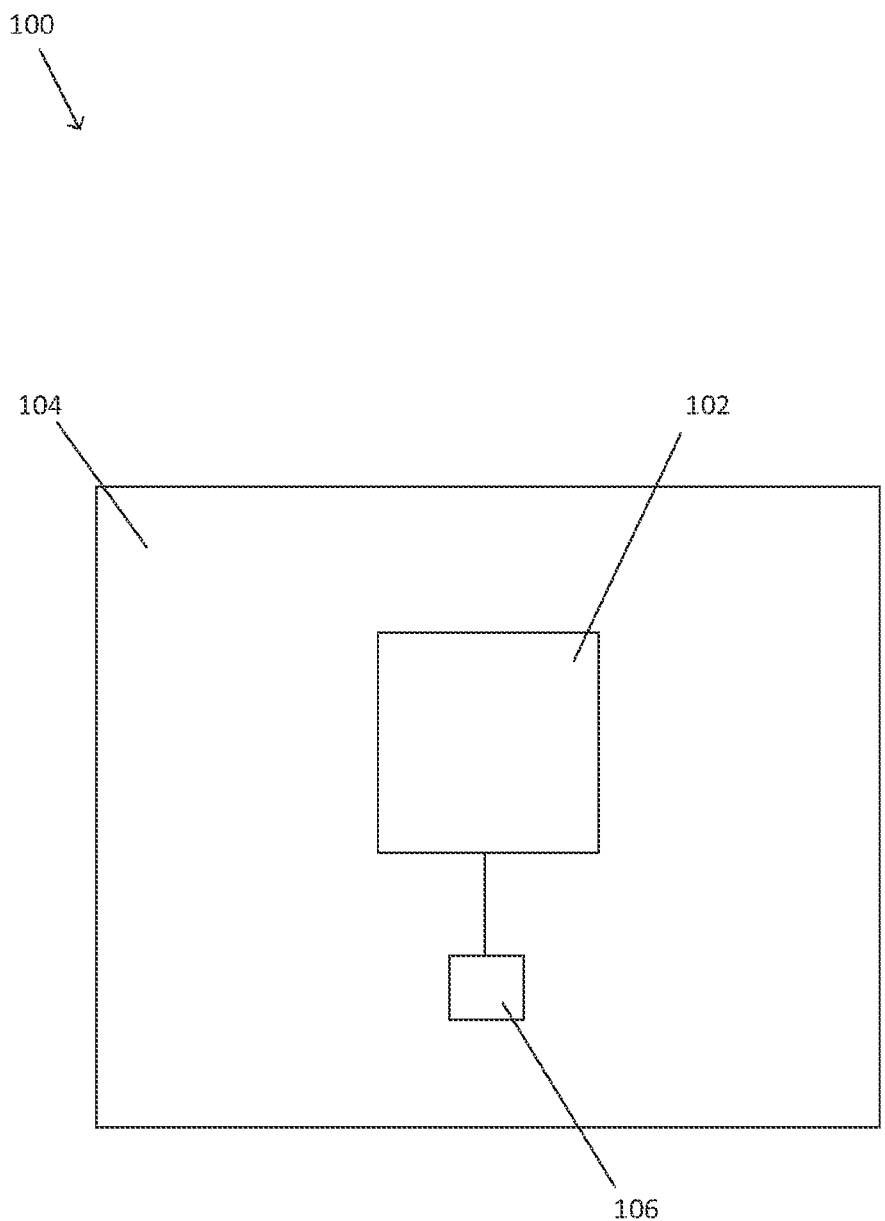
Figure 2A:
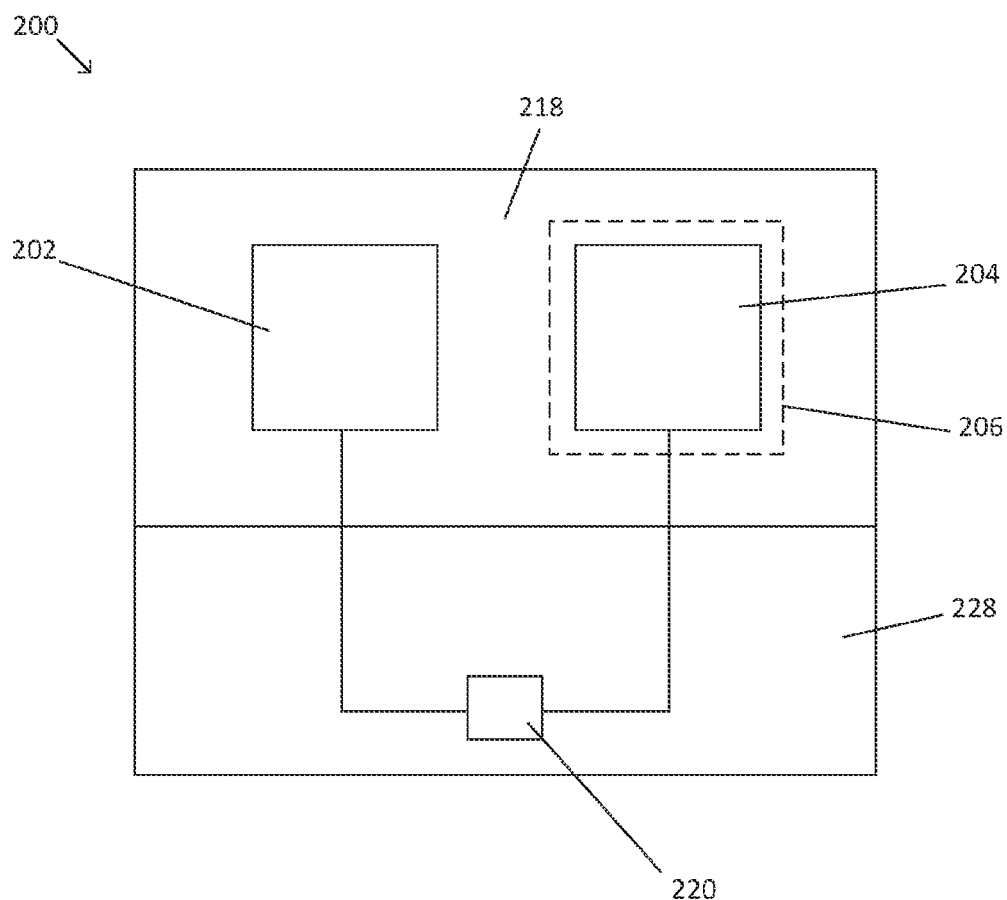
Figure 2B:
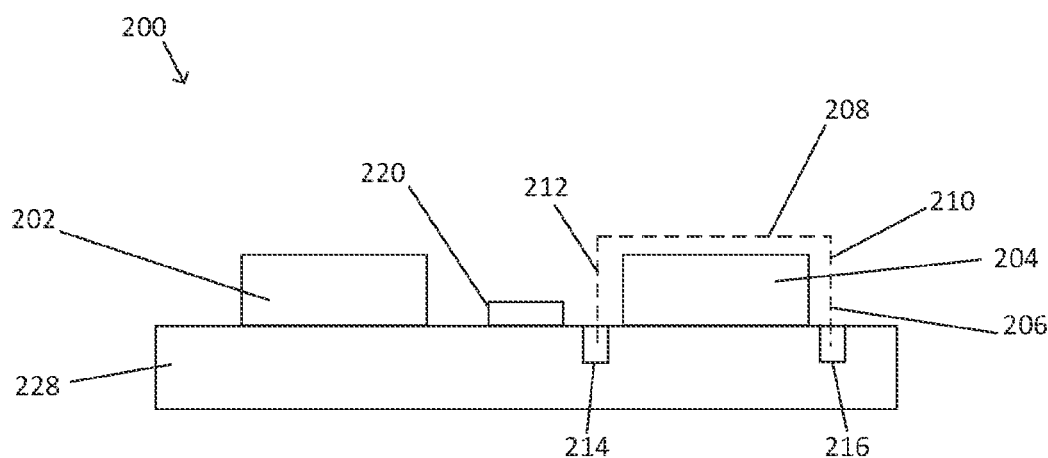

FIG. 2, comprising FIG. 2A and FIG. 2B, schematically depicts a view from above (FIG. 2A) and a cross-sectional view from the side (FIG. 2B) of a sensing system 200 comprising a reference sensor 204 and a shield 206. The sensing system 200 comprises a measurement sensor 202 configured to detect electromagnetic radiation (i.e. photons). The measurement sensor 202 may comprise a photon counter such as a single photon avalanche diode. The sensing system 200 comprises a reference sensor 204 configured to detect a source of measurement uncertainty. The measurement uncertainty may be referred to as measurement noise. The source of measurement uncertainty may comprise dark counts and/or a dark count rate. The reference sensor 204 may comprise a photon counter such as a single photon avalanche diode. The measurement sensor 202 and the reference sensor 204 may be substantially identical. That is, the measurement sensor 202 and the reference sensor 204 may be capable of detecting substantially the same electromagnetic radiation and may comprise substantially the same arrangement of components.

The sensing system 200 comprises a shield 206 configured to reduce an interaction between the electromagnetic radiation and the reference sensor 204. The shield 206 is depicted using a dashed line in FIGS. 2A and 2B such that the reference sensor 204 remains visible in FIGS. 2A and 2B. In reality, the reference sensor 204 may not be visible behind the shield 206. The shield 206 may be configured to block (e.g. reflect, redirect and/or absorb) at least some electromagnetic radiation that would otherwise be incident upon and potentially interact with the reference sensor 204 to generate a breakdown event. The shield 206 may be configured to reduce an amount of electromagnetic radiation that originates from outside the sensing system 200 from being incident upon the reference sensor 204. The shield 206 may be configured to at least partially block a line of sight between the reference sensor 204 and an external environment of the sensing system 200. The shield 206 may be sized, shaped and/or positioned to at least partially block a line of sight between the reference sensor 204 and an external environment of the sensing system 200. The shield 206 may substantially surround the reference sensor 204.

The shield 206 may be configured to block an amount of electromagnetic radiation such that a difference exists between the number of counts detected by the measurement sensor 202 and the number of counts detected by the reference sensor 204. The difference between the numbers of counts detected by the measurement sensor 202 and the reference sensor 204 caused by the blocking action of the shield 206 may correspond to an improvement of a quality of a measurement (e.g. a signal-to-noise ratio) of the sensing system 200. For example, the shield 206 may be configured to block about 50% of incident electromagnetic radiation, which may correspond to an improvement of the signal-to-noise ratio of the sensing system 200 of about 50% or less. As another example, the shield 206 may be configured to block about 90% of incident electromagnetic radiation, which may correspond to an improvement of the signal-to-noise ratio of the sensing system 200 of about 90% or less. The shield 206 may be configured to block about 90% or more of incident electromagnetic radiation.

The wavelengths of electromagnetic radiation to which the sensing system 200 is sensitive may depend on a planned use of the sensing system 200. For example, for some biological and/or medical diagnostic uses the sensing system 200 may be configured to detect visible and/or infrared electromagnetic radiation. The shield 206 may be substantially opaque to (e.g. block about 90% or more of) the wavelengths of electromagnetic radiation that are to be detected by the sensing system 200. The shield 206 may be configured to prevent the reference sensor 204 from detecting any electromagnetic radiation that is external to the shield 206.

The shield 206 may comprise a variety of materials depending on the electromagnetic radiation that is to be blocked by the shield 206. The shield 206 may comprise a material having a dielectric constant of about 1.0 or more. The shield 206 may comprise a material having a dielectric constant of about 4.2 or less. The shield 206 may comprise an inorganic material such as, for example, silicon dioxide and/or polysilicon. The shield 206 may comprise an organic material such as, for example, a polymer, e.g. polyimide. A material having a low transmissivity such as, for example, black carbon and/or black silicon may be added to the shield 206 (e.g. an inorganic or organic material of the shield 206) to reduce a transmissivity of the shield 206. The shield 206 may comprise a metal such as, for example, tungsten, aluminium, copper, titanium and/or cobalt. A layer of metal may be provided to adhere the shield 206 to the integrated circuit 218 (e.g. a back-end oxide section of the integrated circuit 218). A layer of metal such as copper may be used as a base for electroplating at least part of the shield 206. The shield 206 may comprise a ceramic such as, for example, titanium nitride. The shield 206 may comprise one or more layers of a bottom anti-reflective coating (BARC) material such as, for example, multiple layers of titanium and/or titanium nitride and/or multiple layers of an inorganic material. The shield 206 may be manufactured using one or more well-known techniques such as, for example, spin coating, chemical vapour deposition, physical vapour deposition, atomic layer deposition, electroplating, etc.

The shield 206 may comprise surfaces of components of the sensing system 200, such as one or more layers of electronic components (not shown) and/or a housing (not shown) of the sensing system 200. The shield 206 may comprise multiple surfaces. Each surface of the shield 206 may be configured to reduce an amount of radiation from being incident upon and interacting with a respective surface of the reference sensor 204. The shield 206 may comprise a plurality of layers (not shown). The plurality of layers may comprise different materials for substantially blocking (e.g. reflecting) different wavelengths of incident electromagnetic radiation. The shield 206 and the reference sensor 204 may have complimentary shapes. The reference sensor 204 may be nested within the shield 206. The shield 206 may comprise a roof 208. The roof 208 may comprise a plurality of layers (not shown). The shield 206 may comprise walls 210, 212. The walls 210, 212 may comprise a plurality of layers (not shown). The walls 210, 212 may be located in one or more trenches 214, 216 positioned around a perimeter of the reference sensor 204. The trenches 214, 216 may be filled with a substantially opaque material to form at least part of the walls 210, 212 of the shield 206. For example, the trenches 214, 216 may be filled with one or more materials mentioned above, e.g. tungsten, polysilicon, organic materials, titanium nitride, one or more layers of bottom anti-reflective coating material, etc. In the example of FIGS. 2A and 2B, the measurement sensor 202 and the reference sensor 204 are located on an integrated circuit 218. The one or more trenches 214, 216 may be located within the integrated circuit 218.

The sensing system 200 comprises a processor 220. In the example of FIGS. 2A and 2B, the processor 220 is located on a different integrated circuit 228 to the measurement sensor 202 and the reference sensor 204. The processor 220 may generate heat when in use. Having the processor 220 on a separate integrated circuit 228 may advantageously reduce an influence of the processor 220 on a condition (e.g. a temperature) of the measurement sensor 202 and/or the reference sensor 204. In other embodiments, the processor 220 may be located on the same integrated circuit 218 as the measurement sensor 202 and the reference sensor 204. Alternatively, the processor 220 may belong to a computing device (not shown), and the sensing system 200 may be connectable to the computing device. The processor 220 is configured to receive information from the measurement sensor 202 and the reference sensor 204, e.g. in the form of electronic signals. The measurement sensor 202 may be configured to produce a measurement signal that is indicative of the electromagnetic radiation detected by the measurement sensor 202. The reference sensor 204 may be configured to produce a reference signal that is indicative of a source of measurement noise detected by the reference sensor 204. The processor 220 may be configured to receive the reference signal and use the reference signal to improve a quality of the measurement signal. For example, the processor 220 may be configured to improve an accuracy and/or a signal-to-noise ratio of the measurement signal.

Determining a characteristic (e.g. an intensity) of the electromagnetic radiation measured by the measurement sensor 202 during a particular measurement period may comprise subtracting the measurement noise that occurred in the measurement period from the measurement signal generated by the measurement sensor 202 during the measurement period. For example, this may comprise subtracting the number of dark counts that occurred in the measurement period from the total number of counts detected by the measurement sensor 202 in the measurement period. As discussed above, dark count rate generally follows the principles of shot noise. That is, the dark count rate experienced by a measurement sensor 202, when plotted over multiple measurement periods, generally follows a Poisson distribution around a median value. The measurement uncertainty resulting from dark counts occurring during the measurement may comprise the following components:

1. An uncertainty of, including any changes to, the median value of the dark count rate.

2. An uncertainty resulting from an inherent statistical fluctuation of the dark count rate around the median value of dark count rate.

The present disclosure includes sensing systems and methods that at least partially reduce the first component of measurement uncertainty by using the reference sensor 204 to improve the quality of the measurement signal produced by the measurement sensor 202. The present disclosure also includes sensing systems and methods that at least partially reduce the second component of measurement uncertainty by increasing a detection area of the measurement sensor 202, which may involve introducing a plurality of measurement sensors 202 to the sensing system 200. The present disclosure also includes a method of designing a sensing system 200 that at least partially accounts for a trade-off between improving the quality of measurements performed using the sensing system 200 and selecting the size and/or number or measurement sensors 202 and/or reference sensors 204 to incorporate into the sensing system 200.

The signal-to-noise ratio of the measurement signal may by defined as a ratio between an amount of desired information within the measurement signal (e.g. the number of breakdown events caused by photons incident on the measurement sensor 202) and an amount of undesired information within the measurement signal (e.g. the number of dark counts detected by the measurement sensor 202 during the measurement).

One aspect of the present disclosure describes a method that improves the quality of the measurement signal (e.g. increases the signal-to-noise ratio of the measurement signal) by using the reference sensor 204 having the shield 206 (i.e. a "blinded" sensor) to reduce the measurement uncertainty resulting from dark counts. The method may substantially eliminate the component of measurement uncertainty caused by the uncertainty of, and any changes to, the median value of the dark count rate.

As discussed above, the median value of the dark count rate experienced by the measurement sensor 202 during a measurement is at least partially dependent on conditions such as a temperature of the measurement sensor 202 and/or a bias voltage applied to the measurement sensor 202. If the median value of the dark count rate is measured for a period before the start of the measurement, the assumption that the dark count rate varies around this median value for the entirety of the measurement is only true if the conditions remain substantially stable throughout the measurement. However, having such stable conditions is unlikely to occur in reality, especially for measurements that occur over longer periods (e.g. measurements lasting ten minutes or more). For example, some bio-diagnostic tests performed using the sensing system 200 may involve measurements that occur for between fifteen and thirty minutes.

To at least partially account for the uncertainty resulting from the uncertainty of, and any changes to, the median value of dark count rate, the reference sensor 204 may be used to monitor the median value of dark count rate. The reference sensor 204 may be configured to continuously monitor the median value of the dark count rate during a measurement performed using the measurement sensor 202. The shield 206 is configured to increase an insensitivity of the reference sensor 204 to photons that are incident on the sensing system 200, thereby improving an ability of the reference sensor 204 to detect the source of measurement noise (e.g. dark counts).

The measurement sensor 202 and the reference sensor 204 may be configured to experience substantially the same conditions. The measurement sensor 202 and the reference sensor 204 may be configured to experience substantially the same temperature. Having the measurement sensor 202 and the reference sensor 204 located on the same integrated circuit 218 (or die) may advantageously improve a similarity between the conditions experienced by the measurement sensor 202 and the conditions experienced by the reference sensor 204. The reference sensor 204 may be located proximate the measurement sensor 202 such that the temperature of the reference sensor 204 is substantially the same as the temperature of the measurement sensor 202. For example, the measurement sensor 202 and the reference sensor 204 may be separated by about 1 mm or less. The measurement sensor 202 and the reference sensor 204 may be separated by about 0.5 mm or less. A thermally conductive path (not shown) may be provided between the measurement sensor 202 and the reference sensor 204. The thermally conductive path may be configured to conduct heat between the measurement sensor 202 and the reference sensor 204 to reduce a temperature difference between the measurement sensor 202 and the reference sensor 204. The thermally conductive path may be provided by the integrated circuit 218. An electronic device may incorporate the sensing system 200. The electronic device may comprise heat sources and/or heat sinks (e.g. as part of a heat control system). It may be beneficial to position the measurement sensor 202 and the reference sensor 204 such that they are separated from any heat sources or heat sinks by approximately equal amounts.

The measurement sensor 202 and the reference sensor 204 may be configured to receive substantially the same bias voltage. Both the measurement sensor 202 and the reference sensor 204 may be connected to a single output of an electronic circuit such that the bias voltage received by the measurement sensor 202 is substantially the same as the bias voltage received by the reference sensor 204 during use of the sensing system 200.

An improved measure of the number of photons counted by the measurement sensor 202 during a measurement period may be determined by subtracting the number of counts detected by the reference sensor 204 during the measurement period from the total number of counts detected by the measurement sensor 202 during the measurement period. The number of counts detected by the reference sensor 204 may be substantially equal to the number of dark counts and/or a median value of dark count rate experienced by the measurement sensor 202 during the measurement period.

Within an area of the integrated circuit 218 (area within a radius of about 2 mm or less), both the measurement sensor 202 and the reference sensor 204 may have substantially identical ensemble properties (i.e. properties that affect the behavior of the sensors 024, 202). The ensemble properties may include conditions such as, for example, temperature and/or bias voltage. The ensemble properties may include process characteristics of the sensors 202, 204 such as, for example, doping concentrations that may at least partially determine a dark count rate experienced by the measurement sensor 202 and the reference sensor 204.

As previously discussed, the shield 206 may comprise one or more non-transparent materials that act to at least partially "blind" the reference sensor 204 from incident electromagnetic radiation (i.e. photons). Side leakage of charge carriers (e.g. electrons generated by photons) from the measurement sensor 202 to the reference sensor 204 may be reduced or avoided by constructing walls, such as trenches filled with tungsten or polysilicon, organic materials, titanium nitride, one or more layers of bottom anti-reflective coating material, etc. A provision in the package or housing of the sensing system 200 may be provided to reduce or prevent electromagnetic radiation from interacting with the reference sensor 204. For example, a housing of the sensing system 200 may include on optical window that is optically aligned with the measurement sensors 202 but not the reference sensors 204. That is, the optical window may be configured to allow electromagnetic radiation to enter the sensing system 200 and be incident on the measurement sensor 202 but not the reference sensor 204. Such an arrangement is depicted in FIG. 6. The optical window and/or the housing of the sensing system 200 may be formed using manufacturing techniques such as film-assisted molding. By design the housing of the sensing system 200 such that the optical window is aligned with the measurement sensors 202 only (i.e. not the reference sensors 204), then at least some of the other parts of the housing may act as the shield for the reference sensors 204.

The following passages provide a mathematical description of the measurement uncertainty experienced by the measurement sensor 202. In the following passages, the example of a measurement sensor 202 comprising a single photon avalanche diode is used. However, it will be appreciated that the equations used are not limited to single photon avalanche diodes and may be used with measurement sensors (e.g. photon counters) in general. The first part of the mathematical description determines the measurement noise experienced by one single photon avalanche diode. A desired measurement signal produced by the measurement sensor 202 (i.e. without the presence of dark counts) may be defined by the following equation:

$$\text{Signal}_{1.SPAD} = k \cdot \text{Photons}_{per.SPAD} \quad \text{Equation 1}$$

where k is a fraction that is less than one (in reality not all incident photons will trigger breakdown events) and $\text{Photons}_{per.SPAD}$ is the number of photons incident on one single photon avalanche diode. The total count detected by the measurement sensor 202 (i.e. including dark counts) may be defined by the following equation:

$$\text{Count}_{1.SPAD} = \text{Signal}_{1.SPAD} + \text{DCR}_{1.SPAD} \quad \text{Equation 2}$$

where $\text{DCR}_{1.SPAD}$ is the dark count rate experienced by the measurement sensor 202. The dark count rate experienced by the measurement sensor 202 may be defined by the following equation:

$$\text{DCR}_{1.SPAD} = \text{DCR}_{Median} + \Delta\text{DCR}_{Fluctuation} \quad \text{Equation 3}$$

where $\text{DCR}_{Median}$ is the median value of dark count rate and $\Delta\text{DCR}_{Fluctuation}$ is the inherent statistical fluctuation of the dark count rate around the median value. One method of at least partially accounting for the dark count rate experienced by the measurement sensor 202 to determine an "apparent" signal involves deleting an expected median value of dark count rate from the total count detected by the measurement sensor 202, as per the following equation:

$$\text{Signal\_Apparent}_{1.SPAD} = \text{Count}_{1.SPAD} - \text{DCR}_{Median.Expected} \quad \text{Equation 4}$$

Equations 2 and 3 may be substituted into Equation 4 to provide the following relationship:

$$\text{Signal\_Apparent}_{1.SPAD} = \text{Signal}_{1.SPAD} + \text{DCR}_{Median} + \Delta\text{DCR}_{Fluctuation} - \text{DCR}_{Median.Expected} \quad \text{Equation 5}$$

A change or shift of the median dark count rate may be defined using the following equation:

$$\Delta\text{DCR}_{MedianShift} = \text{DCR}_{Median} - \text{DCR}_{Median.Expected} \quad \text{Equation 6}$$

Equation 6 and Equation 5 may be combined to provide the following relationship:

$$\text{Signal\_Apparent}_{1.SPAD} = \text{Signal}_{1.SPAD} + \Delta\text{DCR}_{MedianShift} + \Delta\text{DCR}_{Fluctuation} \quad \text{Equation 7}$$

An error of the measurement signal produced by the measurement sensor 202 (i.e. a measurement error) may be defined by the following equation:

$$\text{Error}_{Signal.1.SPAD} = \text{Signal}_{1.SPAD} - \text{Signal\_Apparent}_{1.SPAD} = \Delta\text{DCR}_{MedianShift} + \Delta\text{DCR}_{Fluctuation} \quad \text{Equation 8}$$

Measurement noise may be defined as an uncertainty in the measured signal. As previously discussed, the uncertainty in the measured signal resulting from dark counts may comprise the following two components:
1. An uncertainty of, and any changes to, the median value of the dark count rate (i.e. any change or shift from an expected median dark count rate due to, for example, changes in temperature of measurement sensor 202 and/or changes in a bias voltage acting on the measurement sensor 202 during the measurement).
2. An uncertainty due to the inherent statistical fluctuation of the dark count rate around the median value.

The uncertainty due to the inherent statistical fluctuation of the dark count rate may substantially correspond to a standard deviation of the Poissonian dark count rate distribution. Using this relationship and Equation 8, the uncertainty or noise within the measured signal may be defined as follows:

$$\text{Noise}_{1.SPAD} = \text{Uncertainty}_{Signal.1.SPAD} = \text{Uncertainty}(\text{Error}_{Signal.1.SPAD}) = \Delta\text{DCR}_{MedianShift} + \text{STD}(\Delta\text{DCR}_{Fluctuation}) \quad \text{Equation 9}$$

where $\text{STD}(\Delta\text{DCR}_{Fluctuation})$ is the standard deviation of the inherent statistical fluctuation of the dark count rate around the median value. As previously discussed, like shot noise, dark count rate follows a Poisson distribution around a median value. A standard deviation of a Poisson distribution is equal to the square root of the mean of the Poisson distribution. This definition may be applied to the Poissonian dark count rate distribution as per the following equation:

$$\text{STD}(\Delta\text{DCR}_{Fluctuation}) = \sqrt{\text{DCR}_{Median}} \quad \text{Equation 10}$$

Equation 10 may be substituted into Equation 9 to provide the following relationship:

$$\text{Noise}_{1.SPAD} = \Delta\text{DCR}_{MedianShift} + \sqrt{\text{DCR}_{Median}} \quad \text{Equation 11}$$

Equation 11 defines the measurement noise experienced by a single measurement sensor 202. The following passages mathematically demonstrate that by using the shielded reference sensor 204 in combination with the measurement sensor 202, the measurement noise in the final signal produced by the sensing system 200 may be reduced. As previously discussed, the reference sensor 204 is configured to detect a source of measurement uncertainty that and the shield 206 is configured to reduce an interaction between the electromagnetic radiation and the reference sensor 204. The shield 206 may substantially prevent all external electromagnetic radiation from interacting with the reference sensor 204. The number of counts detected by the reference sensor 204 may provide an estimate of the number of dark counts as per the following equation:

$$\text{Count}_{RefSPAD} = \text{DCR}_{Median} \Delta\text{DCR}_{Fluctuation.RefSPAD} \quad \text{Equation 12}$$

where $\Delta\text{DCR}_{Fluctuation.RefSPAD}$ is the statistical fluctuation of the dark count rate about the median value experienced by the reference sensor 204. One method of at least partially accounting for the dark count rate experienced by the measurement sensor 202 includes deleting an expected median dark count rate from the total number of counts detected by the measurement sensor 202 as per the following equation:

$$\text{Signal\_Apparent}_{1.SPAD.w.Ref} = \text{Count}_{1.SPAD} - \text{DCR}_{Median.Expected.1.SPAD.w.Ref} \quad \text{Equation 13}$$

The reference sensor 204 is configured to detect a source of measurement uncertainty. In the case of a photon counter, the reference sensor 204 may be used to measure the median value of dark count rate. That is, the number and/or rate of counts detected by the reference sensor 204 may be equated to an estimate of the number and/or rate of dark counts experienced by the measurement sensor 202 as per the following equation:

$$DCR_{Median.Expected.1.SPAD.w.Ref} = Count_{RefSPAD} \qquad \text{Equation 14}$$

Equation 14 and Equation 13 may be combined to provide the following relationship:

$$Signal\_Apparent_{1.SPAD.w.Ref} = Count_{1.SPAD} - Count_{RefSPAD} \qquad \text{Equation 15}$$

Equation 12 and Equation 15 may be combined to provide the following relationship:

$$Signal\_Apparent_{1.SPAD.w.Ref} = Count_{1.SPAD} - DCR_{Median} - DCR_{Fluctuation.RefSPAD} \qquad \text{Equation 16}$$

As above, Equation 3 may be substituted into Equation 2, and Equation 2 may then be rearranged to substitute the $Count_{1.SPAD} - DCR_{Median}$ component of Equation 16 to provide the following relationship:

$$Signal\_Apparent_{1.SPAD.w.Ref} = Signal_{1.SPAD} \Delta DCR_{Fluctuation.1.SPAD} - \Delta DCR_{Fluctuation.RefSPAD} \qquad \text{Equation 17}$$

As discussed above, the error of the measurement signal produced by the measurement sensor 202 may be defined by the following equation:

$$Error_{signal.1.SPAD.w.Ref} = \Delta DCR_{Fluctuation.1.SPAD} - \Delta DCR_{Fluctuation.RefSPAD} \qquad \text{Equation 18}$$

Using a similar process to that described above with reference to Equation 9, the uncertainty or noise in the measurement signal may be defined by the following equation:

$$Noise_{1.SPAD.w.Ref} = Uncertainty(Error_{signal.1.SPAD.w.Ref}) = STD(\Delta DCR_{Fluctuation.1.SPAD} - \Delta DCR_{Fluctuation.RefSPAD}) \qquad \text{Equation 19}$$

As can be seen on comparison between Equation 9 and Equation 19, by using the reference sensor 204 and shield 206 in combination with the measurement sensor 202 the $\Delta DCR_{MedianShift}$ component of the measurement uncertainty (i.e. the shift from the expected median dark count rate due to, for example, changes in temperature of the measurement sensor 202 and/or changes in a bias voltage acting on the measurement sensor 202) is no longer present. Instead, there is an increase in the component of measurement uncertainty resulting from inherent statistical fluctuation of dark count rate by the introduction of an inherent statistical fluctuation of dark counts associated with the reference sensor 204. However, the component of measurement uncertainty resulting from statistical fluctuation noise associated with the reference sensor 204 may be significantly smaller than the component of measurement uncertainty resulting from a change or shift of the expected median dark count rate.

Using a similar process as that described above with reference to Equations 10 and 11, (i.e. using the fact that dark count rate follows a Poisson distribution around a median value, and that a standard deviation of a Poisson distribution is equal to the square root of the mean of the Poisson distribution) the measurement uncertainty experienced by the sensing system 200 comprising a measurement sensor 202 and a shielded reference sensor 204 may be defined by the following equation:

$$Noise_{1.SPAD.w.Ref} = \sqrt{(STD(\Delta DCR_{Fluctuation.1.SPAD}))^2 + (STD(\Delta DCR_{Fluctuation.RefSPAD}))^2} \qquad \text{Equation 20}$$

Using the knowledge that the standard deviation of a Poisson distribution (i.e. the distribution of dark counts) is equal to the square root of the mean value of the Poisson distribution, Equation 20 may be rearranged to provide the following relationship:

$$Noise_{1.SPAD.w.Ref} = \sqrt{2} \cdot \sqrt{DCR_{Median}} \qquad \text{Equation 21}$$

Equation 21 defines the measurement noise experienced by a sensing system 200 having a single measurement sensor 202 and a single shielded reference sensor 204. The measurement noise defined by Equation 21 may be less than the measurement noise defined by Equation 11.

As previously discussed, a component of measurement uncertainty results from an inherent statistical fluctuation of the dark count rate around the median value of dark count rate. An estimate of this component of measurement uncertainty may be determined by calculating a standard deviation of the dark count rate distribution. The standard deviation of the dark count rate distribution may be calculated across multiple measurement periods.

The detection area of the measurement sensor 202 may be defined as the area with which incident photons can interact with the measurement sensor 202 to cause a breakdown event and generate a measurement signal. In general, the measurement signal (i.e. the number of photon counts) may increase in proportion to an increase of the detection area of the measurement sensor 202. Similarly, the dark count rate experienced by the measurement sensor 202 may increase in proportion to an increase in the detection area of the measurement sensor 202. Increasing the detection area of the measurement sensor 202 by a factor "N" may result in both the photon count rate and the dark count rate increasing by the factor N. However, the standard deviation of the dark count rate may be equal to the square root of its median value (as a property of shot noise). Thus, the component of measurement uncertainty resulting from the inherent statistical fluctuation of the dark count rate increases by a factor of the square root of the factor N. Thus, the signal-to-noise ratio of the measurement sensor 202 increases by a factor of the square root of N when the detection area of the measurement sensor 202 is increased by the factor N. That is, the "signal" component of the signal-to-noise ratio is increased by N whilst the "noise" component of the signal-to-noise ratio is increased by a factor of the square root of N. As a result, the smallest amount of electromagnetic radiation that can be reliably detected by the measurement sensor 202 may be increased by a factor of the square root of the factor by which the detection area of the measurement sensor 202 is increased.

Increasing the detection area of the measurement sensor 202 may involve introducing multiple measurement sensors to the sensing system (such as the portions of sensing systems depicted in FIGS. 5 and 6). The multiple measurement sensors may be introduced in the form of an array of measurement sensors. The measurement signal from each measurement sensor may be aggregated to reduce the component of measurement uncertainty resting from the inherent statistical fluctuations of the dark count rate. The following passages provide a mathematical description of the reduction of measurement uncertainty by increasing the detection area of the sensing system. In the following passages, the example of a measurement sensor 202 comprising a single photon avalanche diode is used. However, it will be appreciated that the equations used are not limited to single photon avalanche diodes and may be used with measurement sensors (e.g. photon counters) in general.

Referring again to Equation 1 (and restated here for ease of understanding) the actual signal detected (counted) by a measurement sensor 202 (i.e. without dark counts) is as follows:

$$\text{Signal}_{1\cdot SPAD} = k \cdot \text{Photons}_{per\cdot SPAD} \quad \text{Equation 1}$$

As previously discussed, Equation 11 defines the measurement noise experienced using a single measurement sensor 202. Assuming that that there is no change or shift of the median value of dark count rate, Equation 11 can be rearranged to provide the following relationship:

$$\text{Noise}_{1\cdot SPAD} = \text{STD}(\Delta DCR_{Fluctuation}) = \sqrt{DCR_{Median}} \quad \text{Equation 22}$$

The signal-to-noise ratio of a single measurement sensor 202 may be defined by the following equation:

$$SNR_{1\cdot SPAD} = \frac{\text{Signal}_{1\cdot SPAD}}{\text{Noise}_{1\cdot SPAD}} = \frac{k \cdot \text{Photons}_{per\cdot SPAD}}{\sqrt{DCR_{Median}}} \quad \text{Equation 23}$$

By increasing the detection area of the measurement sensor 202 by a factor of "N" (e.g. by introducing an array of "N" measurement sensors) the measurement signal of the sensing system 200 may then be defined by the following equation:

$$\text{Signal}_{N\cdot SPADs} = N \cdot k \cdot \text{Photons}_{per\cdot SPAD} \quad \text{Equation 24}$$

The measurement uncertainty experienced by an array of N measurement sensors may be defined by the following equation:

$$\text{Noise}_{N\cdot SPADs} = \text{STD}(\Delta DCR_{Fluctuation.N.SPADs}) = \sqrt{DCR_{Median.N.SPADs}} = \sqrt{N} \cdot \sqrt{DCR_{Median}} \quad \text{Equation 25}$$

The signal-to-noise ratio of an array of N measurement sensors may be defined by the following equation:

$$SNR_{N\cdot SPADs} = \frac{\text{Signal}_{N\cdot SPADs}}{\text{Noise}_{N\cdot SPADs}} = \frac{N \cdot k \cdot \text{Photons}_{per\cdot SPAD}}{\sqrt{N \cdot DCR_{Median}}} = \sqrt{N} \cdot SNR_{1\cdot SPAD} \quad \text{Equation 26}$$

Equation 26 demonstrates that, as discussed above, the signal-to-noise ratio of the sensing system 200 increases by a factor of the square root of N when the detection area of the sensing system (i.e. the detection area(s) of the one or more measurement sensors) is increased by the factor N. That is, the "signal" component of the signal-to-noise ratio is increased by N whilst the "noise" component of the signal-to-noise ratio is increased by a factor of the square root of N.

The detection area of the sensing system 200 may be increased by increasing the size of the measurement sensor 202 and/or by introducing multiple measurement sensors. A tradeoff between increasing the detection area of an individual measurement sensor 202 and introducing multiple measurement sensors to increase the detection area of the sensing system 200 may at least partially depend on a cost of the latter on a utilization factor of the sensing system 200 (i.e. a ratio of a size of a detection area of the measurement sensor 202 to a total area of the measurement senor 204). For example, each measurement sensor 202 may comprise associated electronic circuitry components (e.g. voltage bias circuit component, a quench circuit component, a read circuit component, a count circuit component, etc.). Each of these electronic circuit components requires some area to be housed within the sensing system 200. If one measurement sensor 202 were replaced by two smaller measurement sensors then the sensing system 200 would require an extra set of electronic components for the additional measurement sensor, thereby increasing the total area of the sensing system.

The maximum detection area of a measurement sensor 202 may be limited in practice by a decreasing yield. The yield of a measurement sensor may be defined as the amount of functioning detection area of the measurement sensor 202 compared to the total detection area of the measurement sensor 202. For example, the yield of measurement sensor 202 may be the amount of functioning detection area of the measurement sensor as a percentage of the total detection area of the measurement sensor. In general, some defects may occur when manufacturing the detection area of the measurement sensor 202. The probability of introducing a defect may increase when increasing the detection area of the measurement sensor 202. Thus, increasing the detection area of the measurement sensor 202 may decrease the yield of the measurement sensor. The decrease in yield associated with increasing the detection area of the measurement sensor 202 may also lead to an increase in the total size (e.g. area) of the sensing system 200.

The following passages provide a mathematical description of a method of designing a sensing system 200 that at least partially accounts for the trade-off between increasing the detection area of the sensing system and selecting the size and/or number of measurement sensors 202 to incorporate into the sensing system. In the following passages, the example of single photon avalanche diode is used. However, it will be appreciated that the equations used are not limited to single photon avalanche diodes and may be used with measurement sensors (e.g. photon counters) in general.

A relationship between a yield of the detection area of the measurement sensor and a total size of the measurement sensor may be determined. The relationship may comprise a relationship between the yield of a detection area of a measurement sensor 202 and a size of the detection area of the measurement sensor. The relationship may be known for a given type of measurement sensor. The relationship may be determined during development of a particular type of measurement sensor. The relationship may be determined by manufacturing measurement sensors (e.g. multiple arrays of measurement sensors) having different sizes of detection area and determining a number of defects within the measurement sensors. Each result may be plotted and a curve may be fitted to the plotted data to provide a relationship between a yield of the measurement sensor and a size of the detection area of the measurement sensor. The relationship may comprise the number of defects per unit detection area. For example, the measurement sensor may have the following number of defects per unit detection area:

$$ND := 1.1 \cdot 10^{-3} \, \mu m^{-2} \quad \text{Equation 27}$$

A relationship describing yield as a function of detection area (i.e. the amount of functioning detection area compared the total detection area, e.g. the amount of functioning detection area as a percentage of the total detection area) may be defined by the following equation:

$$\text{Yield}(ActiveA) := e^{-ActiveA \cdot ND} \quad \text{Equation 28}$$

where ActiveA is the detection area of the measurement sensor and e is Euler's constant. Equation 28 may be calculated for multiple values of size of detection area (i.e. ActiveA). Equation 28 may be calculated for a range of values of detection area such as, for example, 25 µm² to 1600 µm² in steps of 5 µm² as per the following equation:

$$\text{Active}_A := 25\ \mu m^2; 30\ \mu m^2; \ldots 1600\ \mu m^2 \quad \text{Equation 29}$$

Figure 3:
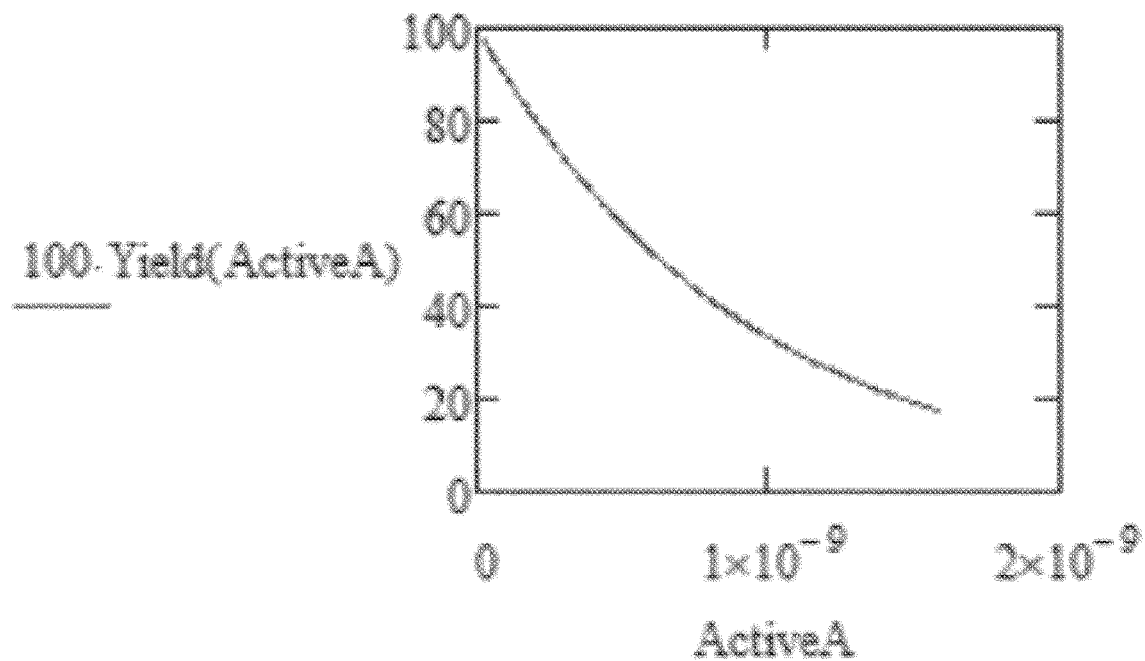
FIG. 3 shows an example plot of a relationship between a yield of a detection area of a measurement sensor and a size of the detection area of the measurement sensor.

FIG. 3 shows an example of a relationship between a yield of a detection area of a measurement sensor and a size of the detection area of the measurement sensor. As can be seen from FIG. 3, the yield decreases with increasing detection area. As such, a balance may be found between increasing the size of the detection area to improve the signal to noise ratio of the sensing system 200 and avoiding diminishing returns via the introduction of too many defects to the sensing system.

As discussed above, the total area required to house a measurement sensor 202 within the sensing system 200 may comprise the detection area of the measurement sensor and a support area of the measurement sensor. The support area may comprise the electronic circuitry components of the measurement sensor 202. The total area of an array of N measurement sensors (including the supporting circuitry needed per measurement sensor) may be defined by the following equation:

$$\text{Total}_{Area} = N_{SPADs} \cdot (\text{Active}_{Area} + \text{Support}_{Area}) \quad \text{Equation 30}$$

If the yield of the measurement sensor 202 is 100% then the number of measurement sensors required would be equal to the total detection area divided by the detection area of each measurement sensor. However, in practice, the yield is likely to be less than 100% due to the presence of defects. As such, a factor representing a less than perfect yield of the measurement sensor 202 may be introduced, and the number of measurement sensors required may be increased by the factor. Using this information, Equation 30 may be rearranged to provide the following relationship:

$$\text{Total}_{Area} = \frac{\text{ActiveA}_{Total\_Reqd}}{\text{Active}_{Area}} \cdot \left(\frac{1}{\text{Yield}}\right) \cdot (\text{Active}_{Area} + \text{Support}_{Area}) \quad \text{Equation 31}$$

where $\text{ActiveA}_{Total\_Reqd}$ is the total detection area of the array of measurement sensors, $\text{Active}_{Area}$ is the detection area of each measurement sensor and $\text{Support}_{Area}$ is the support area of each measurement sensor. Equation 31 may be used to determine an area optimization factor. The area optimization factor may be defined by the following equation:

$$\text{Area\_Factor} = \frac{1}{\text{Active}_{Area}} \cdot \left(\frac{1}{\text{Yield}}\right) \cdot (\text{Active}_{Area} + \text{Support}_{Area}) \quad \text{Equation 32}$$

Equation 32 may be applied to a single measurement sensor to provide the following area optimization factor:

$$\text{Area\_Factor}_{(\text{Active}_{Area}, \text{Support}_{Area})} := \frac{1}{\text{Active}_{Area}} \cdot \left(\frac{1}{\text{Yield}(\text{Active}_{Area})}\right) \cdot (\text{Active}_{Area} + \text{Support}_{Area}) \quad \text{Equation 33}$$

Figure 4:
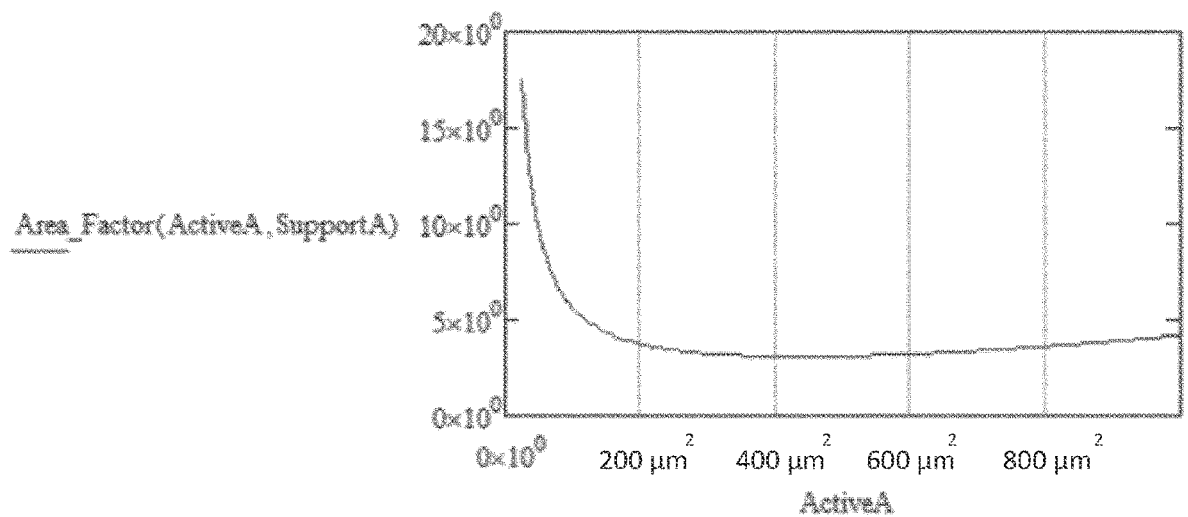
FIG. 4 shows an example plot of an area optimization factor for use in selecting a size of a detection area of a measurement sensor.

The support area may vary for different types of measurement sensor. The size of the detection area of the measurement sensor may be selected to reduce the area optimization factor. FIG. 4 shows an example of a plotted area optimization factor in accordance with an aspect of the present invention. The example of FIG. 4 shows the results of Equation 33 when using the following values of detection area and support area:

$$\text{Active}_{Area} = 25\ \mu m^2; 30\ \mu m^2; \ldots 1000\ \mu m^2 \quad \text{Equation 34}$$

$$\text{Support}_{Area} = 400\ \mu m^2 \quad \text{Equation 35}$$

The area optimization factor may be calculated for each value of the size of the detection area and plotted. An optimum size of the detection area may correspond to the lowest point of the plot of the area optimization factor. In the example of FIG. 4, the optimised value of the size of the detection area is between 200 µm² and 400 µm². A method of designing a sensing system corresponding to the example derivation and use of the area optimization factor described above is shown in FIG. 8.

The sensing system may comprise a plurality of reference sensors 204 and a plurality of measurement sensors 202. With reference to FIG. 5, the sensing system 500 may comprise an array of alternating measurement sensors 502 and reference sensors 504. The plurality of reference sensors 504 may be shielded from electromagnetic radiation by a corresponding plurality of shields 506. Alternatively, as shown in FIG. 6, the measurement sensors 602 and the reference sensors 604 may be arranged in separate arrays and a single large shield 620 may be used to shield the array of reference sensors 604 from electromagnetic radiation. Data from the plurality of measurement sensors may be aggregated to provide an aggregated measurement signal. Data from the reference sensors may be aggregated to provide a measure of the median value of dark count rate to be used to improve a quality of an aggregated measurement signal produced by the measurement sensors.

A choice may be made regarding the number of reference sensors to be provided relative to a given number of measurement sensors in a given sensing system. A related choice may be made regarding a first amount of time per measurement that the measurement sensors are configured to collect data for and a second amount of time per measurement that the reference sensors are configured to collect data for. The first amount of time may be at least partially determined by a time resolution requirement of a given use of the sensing system. For example, a given use may require a measurement to be performed within one second (e.g. a medical assay to determine properties of a chemical reaction that requires updated measurement information each second). As another example, a slower chemical reaction to be monitored using the sensing system may require updated measurement information every ten seconds.

The second amount of time may be at least partially determined by an expected rate of change of conditions (such as temperature and/or voltage bias) for a given use of the sensing system. The second amount of time may be proportional to the expected rate of change of conditions for a given use of the sensing system. The second amount of time may be greater than the first amount of time. The first amount of time and the second amount of time may be selected to achieve a desired balance between a size (e.g. an area) of the sensing system and a performance (e.g. a signal-to-noise ratio) of the sensing system. The following passages include a mathematical description of the selection of the number of reference sensors to be provided relative to a given number of measurement sensors in the sensing system to aid understanding of an aspect of the present invention. The following passages also include a mathematical description of the selection of the second amount of time per measurement that the reference sensors are configured to collect data for relative to the first amount of time per measurement that the measurement sensors are configured to collect data for.

In the following example, the sensing system comprises an array of "N" measurement sensors comprising single photon avalanche diodes and an array of "$N_{Ref}$" reference sensors comprising single photon avalanche diodes. The measurement sensors and reference sensors may comprise different types of sensors or photon counters. The measurement sensors are configured to collect data for a first amount of time per measurement and the reference sensors are configured to collect data for a second amount of time per measurement, the second amount of time being greater than the first amount of time.

The second amount of time (during which the reference sensors are configured to collect data) may be defined by the following equation:

$$T_{windowRef} = T\_factor_{RefSP} \cdot T_{window\text{-}SenseSPADs} \quad \text{Equation 36}$$

where $T\_factor_{RefSP}$ is a factor by which the second amount of time relates to the first amount of time and $T_{windowSenseSPADs}$ is the first amount of time (during which the measurement sensors are configured to collect data). A total number of counts detected by the N measurement sensors during the first amount of time may be represented by the following equation:

$$Count_{N.SPADs} = Signal_{N.SPADs} + DCR_{N.SPADS} \quad \text{Equation 37}$$

where $Signal_{N.SPADs}$ is the number of counts generated by incident photons and $DCR_{N.SPADs}$ is the number of dark counts experienced by the measurement sensors. The total number of dark counts experienced by the measurement sensors during the first amount of time may be represented by the following equation:

$$DCR_{N.SPADs} = N \cdot DCR_{Median} + \Delta DCR_{Fluctuation.N.SPADs} \quad \text{Equation 38}$$

The total number of counts detected by the reference sensors during the second amount of time may be represented by the following equation:

$$Count_{NRefSPADs.Tfactor} = N_{Ref} \cdot T_{factor_{RefSP}} DCR^{Median.Tfactor} + \Delta DCR_{Fluctuation.NRefSPADs.Tfactor} \quad \text{Equation 39}$$

where $DCR_{Median.Tfactor}$ is the median dark count rate (per unit measurement time) averaged across the second amount of time. The measured (or "apparent") signal may be substantially equal to the number of counts detected by the measurement sensors minus the expected median dark count rate, as per the following equation:

$$Signal\_Apparent_{N.SPADs.w.Ref.Tfactor} = Count_{N.SPADs} - DCR_{Median.Expected.N.SPADs.w.Ref.Tfactor} \quad \text{Equation 40}$$

As discussed above, the number of counts detected by the reference sensors may be used as an estimate of the median dark count rate, as per the following equation:

$$DCR_{MedianExpected.N.SPADs.w.Twindow.Ref} = \quad \text{Equation 41}$$

$$\frac{N}{NRef} \cdot \frac{1}{T\_factor_{RefSP}} \cdot Count_{NRefSPADs.Tfactor}$$

Equations 37 to 41 may be combined to provide the following relationship:

$$Signal\_Apparent_{N.SPADs.w.Ref.Tfactor} = \quad \text{Equation 42}$$

$$Signal_{N.Spads} + N \cdot DCR_{Median} + \Delta DCR_{Fluctuation.N.SPADs} -$$

$$\frac{N}{NRef} \cdot \frac{1}{T\_Factor_{RefSP}} \cdot Count_{NRefSPADs.Tfactor}$$

As discussed above (e.g. see Equation 8), the measurement error within the measurement signal produced by the measurement sensors may be represented by the following equation:

$$Error_{Signal.N.SPADs.w.Ref} = \quad \text{Equation 43}$$

$$N \cdot DCR_{Median} + \Delta DCR_{Fluctuation.N.SPADs} -$$

$$\frac{N}{N_{Ref}} \cdot \frac{1}{T\_factor_{RefSP}} \cdot Count_{NRefSPADs.Tfactor}$$

Equations 39 and 43 may be combined to provide the following relationship:

$$Error_{Signal.N.SPADs.w.Ref} = \quad \text{Equation 44}$$

$$N \cdot DCR_{Median} + \Delta DCR_{Fluctuation.N.SPADs} - N \cdot DCR_{Median.Tfactor} -$$

$$\frac{N}{N_{Ref}} \cdot \frac{1}{T\_factor_{RefSP}} \cdot \Delta DCR_{Fluctuation.NRefSPADs.Tfactor}$$

A difference between the median dark count rate during the first amount of time and the median dark count rate during the second amount of time may be represented by the following equation:

$$\Delta DCR_{Median.Shift.Ref.Tfactor} = DCR_{Median} - DCR_{Median.Tfactor} \quad \text{Equation 45}$$

Equations 45 and 44 may be combined to provide the following relationship:

$$Error_{Signal.N.SPADs.w.Ref} = \quad \text{Equation 46}$$

$$N \cdot \Delta DCR_{MedianShift.Ref.Tfactor} + \Delta DCR_{Fluctuation.N.SPADs} -$$

$$\frac{N}{N_{Ref}} \cdot \frac{1}{T\_factor_{RefSP}} \cdot \Delta DCR_{Fluctuation.NRefSPADs.Tfactor}$$

The measurement uncertainty or noise may be defined as the uncertainty in the measured signal as per the following equation:

$$\text{Noise}_{N\text{-}SPADs\text{-}w\text{-}Ref\text{-}Tfactor} = N \cdot \Delta DCR_{MedianShift\text{-}Ref\text{-}Tfactor} + \sqrt{\begin{array}{c}(STD(\Delta DCR_{Fluctuation\text{-}N\text{-}SPADs}))^2 + \\ \left(STD\left(\frac{N}{N_{Ref}} \cdot \frac{1}{T\_factor_{RefSP}}\right) \cdot \\ \Delta DCR_{fluctuation\text{-}NRefSPADs\text{-}TFactor}\right)^2\end{array}}$$

Equation 47

As discussed above, using the knowledge that the standard deviation of a Poisson distribution is equal to the square root of the median value of the distribution, Equation 47 may be rearranged to provide the following relationship:

$$\text{Noise}_{N\text{-}SPADs\text{-}w\text{-}Ref\text{-}Tfactor} = N \cdot \Delta DCR_{MedianShift\text{-}Ref\text{-}Tfactor} + \sqrt{N \cdot DCR_{Median} + \left(\frac{N}{N_{Ref}} \cdot \frac{1}{T\_factor_{RefSP}}\right)^2 \cdot N_{Ref} \cdot T\_factor_{RefSP} \cdot DCR_{Median}}$$

Equation 48

The terms $\sqrt{N}$ and $\sqrt{DCR_{Median}}$ may be brought out as a common factor, such that Equation 48 can be rearranged to provide the following relationship:

$$\text{Noise}_{N\text{-}SPADs\text{-}w\text{-}Ref\text{-}Tfactor} = N \cdot \Delta DCR_{Median\ Shift\text{-}Ref\text{-}Tfactor} + \sqrt{1 + \frac{N}{N_{Ref} \cdot T\_factor_{RefSP}}} \cdot \sqrt{N} \cdot \sqrt{DCR_{Median}}$$

Equation 49

If the change in median dark count rate is relatively small during the second amount of time then the following relationship may apply:

$$\Delta DCR_{Median\ Shift.Ref.Tfactor} << \sqrt{DCR_{Median}}$$

Equation 50

Equations 49 and 50 may be combined to provide the following relationship:

$$\text{Noise}_{N\text{-}SPADs\text{-}w\text{-}Ref\text{-}Tfactor} = \sqrt{1 + \frac{N}{N_{Ref} \cdot T\_factor_{RefSP}}} \cdot \sqrt{N} \cdot \sqrt{DCR_{Median}}$$

Equation 51

As shown above, if the first amount of time and the second amount of time are different then an error may be introduced by a difference in the median dark count rate experienced during these two periods. However, the first amount of time may be selected to be small enough to allow only a relatively small change of conditions (e.g. temperature and voltage bias) and a correspondingly small change in median dark count rate.

The first amount of time and the second amount of time may overlap. The measurement sensors and the reference sensors may be configured to collect data simultaneously. The first amount of time may encompass the second amount of time. This may advantageously reduce a difference in the median dark count rate of the first and second amounts of time such that Equations 50 and 51 apply. The remaining measurement uncertainty may be proportional to the following factor:

$$\sqrt{1 + \frac{N}{N_{Ref} \cdot T\_factor_{RefSP}}}$$

If the factor $N_{Ref} \cdot T\_factor_{RefSP}$ is smaller than N (i.e. the number of measurement sensors) then the component of measurement uncertainty resulting from inherent statistical fluctuation of dark count rate may be dominated by the data collected by the reference sensors. On the other hand, $N_{Ref} \cdot T\_factor_{RefSP}$ is larger than N then the component of measurement uncertainty resulting from inherent statistical fluctuation of dark count rate may be dominated by the data collected by the measurement sensors. To avoid domination by either type of sensor, a balanced selection of both the number of reference sensors and the second amount of time during which the reference sensors collect data may be determined using the following relationship:

$$N_{Ref} T_{factor_{RefSP}} = N$$

Equation 52

Equation 52 provides a number of selection possibilities. The appropriateness of each possibility may at least partially depend on the expected stability of conditions such as temperature and voltage bias for a given use of the sensing system. A first option comprises selecting an equal number of measurement sensors and reference sensors, and selecting equal values of the first amount of time and the second amount of time. The first option may advantageously simplify processing of the data collected by the measurement sensors and the reference sensors. The first option may advantageously provide an optimum signal to noise ratio of the sensing system. A second option may comprise selecting a number of reference sensors that is smaller than the number of measurement sensors and selecting a second amount of time that is greater than the first amount of time. For example, the number of measurement sensors may be four times greater than the number of reference sensors. The second option may advantageously reduce a size of the sensing system. The second option may further comprise limiting the second amount of time such that the total measurement period does not extend beyond a desired limit. For example, the second amount of time may be selected such that the total measurement period does not exceed one minute. For example, the second amount of time may be selected such that the total measurement period does not exceed thirty seconds. For example, the second amount of time may be selected such that the total measurement period does not exceed fifteen seconds. It may be assumed that conditions such as temperature are stable over a period of several seconds or several tens of seconds depending given a particular use of the sensing system (e.g. if the sensing system is incorporated into a device having active heat regulation).

The following passages describe an example of a sensing system. FIG. 5 schematically depicts a view from above a portion of the example sensing system 500 comprising an array of alternating measurement sensors 502 and reference sensors 504 having shields 506. The measurement sensors 502 and reference sensors 504 are located on an integrated circuit 518. The sensing system 500 is configured to collect data across a measurement period of one second. In the example of FIG. 5, each measurement sensor 502 comprises a single photon avalanche diode. At a given temperature and voltage bias, the median dark count rate experienced by each measurement sensor 502 may be one hundred per second. Assuming that the temperature and the bias voltage remain substantially constant, the measurement uncertainty may be determined by calculating the standard deviation of the median dark count rate experienced by each measurement sensor 502 (i.e. the square root of one hundred). The measurement noise is therefore ten. A given use of the sensing system 500 may require a signal to noise ratio of, for example, five to reliably detect electromagnetic radiation. Comparing the measurement noise and the signal to noise ratio, the minimum signal that can be detected by a single measurement sensor 502 is fifty (i.e., fifty counts triggered by incident photons).

The electromagnetic radiation to be detected may have a relatively low intensity that produces five photon counts per measurement sensor 502 per second. To be able to detect this low level of electromagnetic radiation, a group of one hundred measurement sensors 502 may be used. Only six of the measurement sensors 502 are visible in FIG. 5 to avoid overcomplicating FIG. 5 and to aid understanding. The total amount of counts per second triggered by incident photons across all one hundred measurement sensors 502 is equal to five hundred. The total amount of counts per second triggered by dark counts across all one hundred measurement sensors 502 is equal to ten thousand. The total measurement uncertainty may be determined by calculating the standard deviation of the total dark count rate (i.e. the square root of ten thousand). The total measurement uncertainty is equal to one hundred. Thus, comparing the total number of counts to the total measurement uncertainty, the signal to noise ratio is equal to five.

Now it is assumed that during the measurement period the temperature of the sensing system 500 decreases by 0.1 degrees Celsius. The median dark count rate experienced by each measurement sensor 502 may then reduce from one hundred per second to ninety-five per second. The total amount of counts per second triggered by dark counts across all one hundred measurement sensors 502 is equal to nine thousand and five hundred. The total amount of counts per second triggered by incident photons across all one hundred measurement sensors 502 remains equal to five hundred. The total number of counts per second (including both those generated by photons and those generated by dark counts) across all one hundred measurement sensors 502 is equal to ten thousand. If no reference sensors 504 and shields 506 are provided to monitor the median dark count rate, then the sensing system 500 cannot detect that the median dark count rate has changed. Thus, a sensing system lacking any reference sensors 504 would incorrectly conclude that no photons have been incident on the measurement sensors 502.

By introducing a plurality of shielded reference sensors 504 to monitor the median dark count rate the accuracy of the measurement may be improved. For example, one hundred shielded single photon avalanche diodes may be introduced as reference sensors 504. Only six of the reference sensors 504 are visible in FIG. 5 to avoid overcomplicating FIG. 5 and to aid understanding. The reference sensors 504 are configured to detect a source of measurement uncertainty (which, in this example, comprises dark counts) and provide an estimate of the measurement uncertainty experienced by the measurement sensors 502 (which, in this example, comprises the median dark count rate). The reference sensors 504 are sensitive to the decrease in dark count rate caused by the decrease in temperature. The reference sensors 504 therefore count the correct number of dark counts (i.e. nine thousand and five hundred dark counts). The number of counts detected by the reference sensors 504 may be deducted from the total number of counts detected by the measurement sensors 502 (i.e. ten thousand minus nine thousand and five hundred). The sensing system 500 comprising the reference sensors 504 and shields 506 therefore correctly concludes that five hundred photons have been incident on the measurement sensors 502, thereby improving an accuracy of the sensing system 500 compared to when no reference sensors 504 are provided.

The following passages provide a second example of a sensing system. FIG. 6 schematically depicts a view from above a portion of the second example sensing system 600 comprising separate arrays of measurement sensors 602 and reference sensors 604 in accordance with an aspect of the present invention. The second example sensing system 600 comprises a number of reference sensors 604 that is smaller than the number of measurement sensors 602. For example, the sensing system 600 may comprise one hundred measurement sensors 602 and twenty-five reference sensors 604. In this case, there are four times more measurement sensors 602 than reference sensors 604. As such, the second amount of time during which the reference sensors 604 collect data may be four times longer than the first amount of time during which the measurement sensors 602 collect data. The measurement sensors 602 may be configured to collect data for one second. The reference sensors 604 may be configured to collect data for four seconds. The one second in which the measurement sensors 602 collect data may occur around the middle of the four second period during which the reference sensors 604 collect data. The conditions such as temperature and voltage bias may be unlikely to vary significantly on either side of the first amount of time. As such, measurement uncertainty introduced by a difference between the median dark count rate experienced by the reference sensors 604 and the median dark count rate experienced by the measurement sensors 602 is likely to be relatively small.

The reference sensors 604 are arranged in a separate array to the measurement sensors 602. In this way, there can be some separation to reduce or prevent crosstalk between the measurement sensors 602 and the reference sensors 604. The sensing system 600 is arranged such that an optical window 610 of the sensing system 600 is only located over the array of measurement sensors 602 and not over the array of reference sensors 604. As such, a portion of the housing 620 of the sensing system 600 acts as a shield to reduce an interaction between the reference sensors 604 and electromagnetic radiation that is to be detected by the sensing system 600. The portion of the housing 620 that acts as a shield for the reference sensors 604 is depicted using a dashed line in FIG. 6 such that the reference sensors 604 are visible to aid understanding. In reality, the reference sensors 604 may not be visible behind the portion of the housing 620 that acts as a shield. As discussed above, the data collected by the measurement sensors 604 is used to improve a quality of the data collected by the measurement sensors 602.

FIG. 7 shows a flowchart of a method of detecting electromagnetic radiation in accordance with an aspect of the present invention. A first step S1 of the method comprises using a measurement sensor to detect electromagnetic radiation. A second step S2 of the method comprises using a reference sensor to detect a source of measurement uncertainty. A third step S3 of the method comprises using a shield to reduce an interaction between the electromagnetic radiation and the reference sensor.

FIG. 8 shows a flowchart of a method of designing a sensing system comprising a measurement sensor comprising a detection area configured to detect electromagnetic radiation in accordance with an aspect of the present invention. A first step S10 of the method comprises determining a relationship between a yield of the detection area of the measurement sensor and a total size of the measurement sensor. A second step S11 of the method comprises using the relationship to define an area optimization factor. A third step S12 of the method comprises using the area optimization factor to select a size of the detection area.

The sensing systems and methods disclosed herein may be utilized in a large variety of technical fields and devices, such as medical devices, chemical analysis devices, telecommunications devices, consumer devices, point of care diagnostics, luminescence detection, fluorescence detection, spectroscopy, electronic nose-type applications with luminescence and/or fluorescence detection, etc.

The sensing systems and methods described herein may be utilized in the fields of telecommunications and consumer products. The sensing system may form part of a telecommunications system. For example, the sensing system may be configured to detect electromagnetic radiation emanating from an optical fiber, such as a telecommunications fiber. The sensing system may advantageously improve an accuracy and/or speed with which optical signals can be detected within the telecommunications system. The sensing system may form part of a computing device such as a mobile phone or a tablet computer. From example, the sensing system may form part of an ambient light sensor. The ambient light sensor may be configured to receive a measurement signal form the sensing system and use the measurement to adjust a characteristic of the computing device. For example, the measurement signal received from the sensing system may be used to adjust a brightness of a screen of the computing device. The sensing system may advantageously enable the ambient light sensor to detect lower levels of electromagnetic radiation and/or increase a dynamic range of the ambient light sensor. The computing device comprising the sensing system may comprise physical connection means for connecting the computing device to other devices, such as a Universal Serial Bus (USB) connector. The computing device comprising the sensing system may comprise wireless connection means such as Near-Field Communication (NFC). The computing device comprising the sensing system may comprise a power source such as a battery for powering the sensing system.

The sensing systems and methods described herein may be utilized in life sciences. For example, the sensing system may form part of a medical device such as a diagnostics device. The sensing system may form part of a disposable diagnostics device (e.g. a disposable cartridge) that itself can be attached to and communicate with a computing device. For example, the sensing system may form part of a lateral flow test device and/or a multi-fluidic device such as a micro-fluidic chip or cartridge configured to analyze biological samples such as blood, saliva, urine, etc. The sensing system may comprise a plurality of arrays of measurement sensors (e.g. single photon avalanche diodes). Each array of measurement sensors may be accompanied by a corresponding array of shielded reference sensors. The measurement sensors may be configured to detect electromagnetic radiation generated by biochemical reactions. The arrays of measurement sensors and reference sensors may form part of a multi-channel integrated circuit. The multi-channel integrated circuit may comprise, for example, one, four, eight or sixteen channels. Different arrays of measurement sensors may be configured to receive electromagnetic radiation from different fluid channels of the multi-fluidic cartridge. Each array of measurement sensors may be shielded such that each array of measurement sensors receives electromagnetic radiation from their respective fluid channel. Each array of measurement sensors may be configured to detect electromagnetic radiation that is indicative of different biochemical parameters, such as reactions involving different antibodies, antigens, enzymes, proteins, etc.

The sensing systems disclosed herein may form part of an application specific integrated circuit (ASIC). The application specific integrated circuit may be configured to perform fluorescence measurements, luminescence measurements, reflectance measurements and/or absorbance measurements by using the sensing system to detect electromagnetic radiation. The application specific integrated circuit may comprise a source of electromagnetic radiation, such as a photodiode, that is separated from the sensing system. The source of electromagnetic radiation may be configured to emit electromagnetic radiation towards a sample. The electromagnetic radiation may interact with (e.g. be at least partially absorbed and/or reflected by the sample) before being detected by the sensing system. The interaction between the sample and the electromagnetic radiation may generate fluorescence radiation and/or luminescence radiation that may be detected by the sensing system. A measurement signal generated by the sensing system may be indicative of a characteristic of the sample.

LIST OF REFERENCE NUMERALS

100 Known sensing system
102 Known measurement sensor
104 Known integrated circuit
106 Known processor
200 Sensing system
202 Measurement sensor
204 Reference sensor
206 Shield
208 Roof of shield
210 First wall of shield
212 Second wall of shield
214 First trench
216 Second trench
218 First integrated circuit
220 Processor
228 Second integrated circuit
500 Portion of a sensing system
502 Measurement sensor
504 Reference sensor
506 Shield
518 Integrated circuit
600 Portion of a sensing system
602 Measurement sensor
604 Reference sensor
610 Optical window
620 Shield portion of housing The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure that are contemplated as falling within the scope of the appended claims. Each feature disclosed or illustrated in the present specification may be incorporated in any embodiments, whether alone or in any appropriate combination with any other feature disclosed or illustrated herein.

The invention claimed is:

1. A sensing system comprising:
   a measurement sensor of a plurality of measurement sensors configured to detect electromagnetic radiation;
   a reference sensor of a plurality of reference sensors configured to detect a source of measurement uncertainty, wherein the plurality of measurement sensors and the plurality reference sensors are arranged to form an array, wherein the array comprises alternating measurement sensors and reference sensors; and
   a shield housing having two or more walls configured to reduce an interaction between the electromagnetic radiation and the reference sensor, wherein the shield housing surrounds at least two sides of the reference sensor, wherein the measurement sensor and the reference sensor are located on a single integrated circuit, and wherein the shield housing comprises the two or more walls located in a trench within the integrated circuit,
   wherein a number of the measurement sensors is equal to a number of the reference sensors multiplied by an integer greater than one, and wherein the measurement sensors are configured to collect data for a first amount of time per measurement and wherein the reference sensors are configured to collect data for a second amount of time per measurement, wherein the second amount of time is equal to the first amount of time multiplied by the integer.

2. The sensing system of claim 1, wherein the measurement sensor comprises a first photon counter and wherein the reference sensor comprises a second photon counter, and/or wherein the first photon counter comprises a first single photon avalanche diode and wherein the second photon counter comprises a second single photon avalanche diode.

3. The sensing system of claim 1, wherein the reference sensor and the measurement sensor are configured to experience substantially the same temperature, and/or wherein the measurement sensor and the reference sensor are configured to receive substantially the same bias voltage.

4. The sensing system of claim 1, wherein the measurement sensor is configured to produce a measurement signal that is indicative of the radiation detected by the measurement sensor, and wherein the reference sensor is configured to produce a reference signal that is indicative of the source of measurement uncertainty detected by the reference sensor, and wherein the sensing system further comprises a processor configured to:
   receive the measurement signal and the reference signal; and,
   use the reference signal to improve a quality of the measurement signal.

5. The sensing system of claim 1, wherein the number of the measurement sensors is equal to four times the number of the reference sensors.

6. An electronic device comprising the sensing system of claim 1.

7. A method of detecting electromagnetic radiation comprising:
   using a measurement sensor of a plurality of measurement sensors to detect the electromagnetic radiation;
   using a reference sensor of a plurality of reference sensors to detect a source of measurement uncertainty, wherein the plurality of measurement sensors and the plurality reference sensors are arranged to form an array, wherein the array comprises alternating measurement sensors and reference sensors; and
   using a shield housing having two or more walls to reduce an interaction between the electromagnetic radiation and the reference sensor, wherein the shield housing surrounds at least two sides of the reference sensor,
   wherein a number of the measurement sensors is equal to a number of the reference sensors multiplied by an integer greater than one, and wherein the measurement sensors are configured to collect data for a first amount of time per measurement and wherein the reference sensors are configured to collect data for a second amount of time per measurement, wherein the second amount of time is equal to the first amount of time multiplied by the integer.

8. The method of claim 7, wherein the number of the measurement sensors is equal to four times the number of the reference sensors.

* * * * *